(12) United States Patent
Fujiune et al.

(10) Patent No.: US 7,257,053 B2
(45) Date of Patent: Aug. 14, 2007

(54) OPTICAL DISC APPARATUS

(75) Inventors: Kenji Fujiune, Moriguchi (JP); Yuuichi Kuze, Settsu (JP); Shin-ichi Yamada, Katano (JP); Katsuya Watanabe, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 478 days.

(21) Appl. No.: 10/475,473

(22) PCT Filed: Apr. 15, 2002

(86) PCT No.: PCT/JP02/03745
§ 371 (c)(1),
(2), (4) Date: Oct. 20, 2003

(87) PCT Pub. No.: WO02/089124
PCT Pub. Date: Nov. 7, 2002

(65) Prior Publication Data
US 2004/0136280 A1 Jul. 15, 2004

(30) Foreign Application Priority Data
Apr. 20, 2001 (JP) ............................. 2001-122433

(51) Int. Cl.
*G11B 7/00* (2006.01)
(52) U.S. Cl. ............................. 369/44.32; 369/44.25; 369/53.18
(58) Field of Classification Search ............. 369/44.32, 369/44.25, 53.18; *G11B 7/00*
See application file for complete search history.

(56) References Cited

U.S. PATENT DOCUMENTS

| | | | | |
|---|---|---|---|---|
| 4,891,798 A | * | 1/1990 | Shinkai | 369/44.25 |
| 5,675,561 A | | 10/1997 | Yoshioka | |
| 5,745,450 A | * | 4/1998 | Miyazono | 369/44.27 |
| 6,829,203 B2 | * | 12/2004 | Yonezawa et al. | 369/44.27 |

FOREIGN PATENT DOCUMENTS

| | | |
|---|---|---|
| EP | 0 535 583 | 4/1993 |
| JP | 52-80802 | 7/1977 |
| JP | 57-120239 | 7/1982 |
| JP | 62-3436 | 1/1987 |
| JP | 2-105338 | 4/1990 |
| JP | 3-110406 | 5/1991 |
| JP | 4-32028 | 2/1992 |
| JP | 4-92216 | 3/1992 |

(Continued)

OTHER PUBLICATIONS

MAT (machine assisted translation of) JP 10-116423.*

*Primary Examiner*—A M Psitos
(74) *Attorney, Agent, or Firm*—Hamre, Schumann, Mueller & Larson, P.C.

(57) ABSTRACT

An optical disk apparatus having a high reliability by evading collision between a condensing lens and an optical disk regardless whether the focus control is in the operative state or in the inoperative state, thereby preventing damage to the condensing lens and the optical disk. When the focus control is in the inoperative state, by using a reflection light amount from the optical disk (1), it is ascertained that the focus of the light beam is in the vicinity of the information surface and the condensing lens (15) is driven to be apart from the optical disk (1).

3 Claims, 13 Drawing Sheets

FOREIGN PATENT DOCUMENTS

| | | |
|---|---|---|
| JP | 4-177618 | 6/1992 |
| JP | 5-151603 | 6/1993 |
| JP | 5-182206 | 7/1993 |
| JP | 6-119648 | 4/1994 |
| JP | 6-187654 | 7/1994 |
| JP | 10-116423 * | 6/1998 |
| JP | 2001-101677 | 4/2001 |
| JP | 2001-134954 | 5/2001 |

* cited by examiner

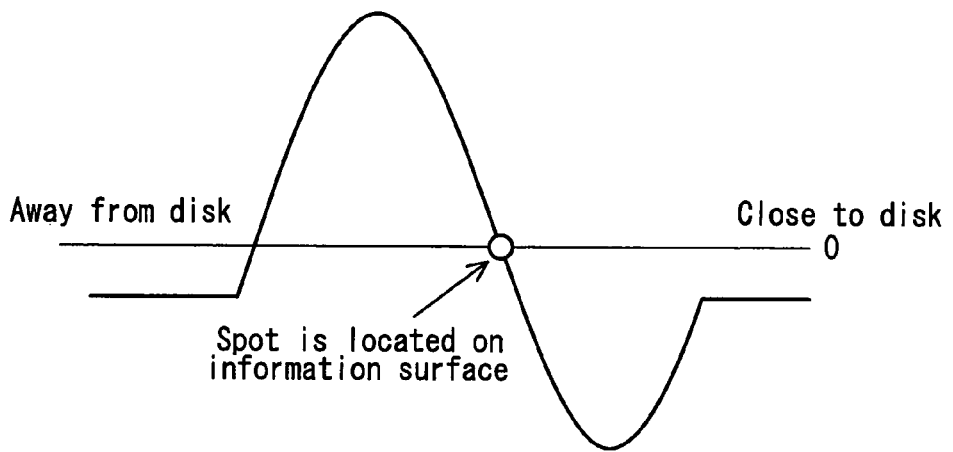
FIG. 7
FIG. 8A
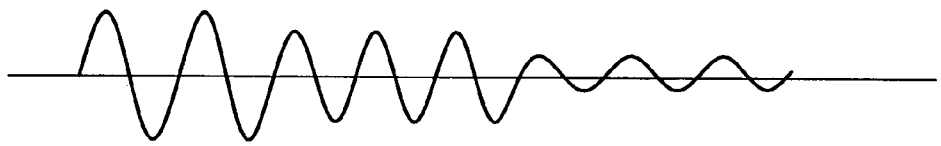
FIG. 8B
FIG. 8C
FIG. 8D

OPTICAL DISC APPARATUS

TECHNICAL FIELD

The present invention relates to optical disk apparatuses that record information on a rotating disk-shaped information carrier (referred to as "optical disk" in the following) or reproduce information recorded on the optical disk by converging and irradiating an light beam coming from a light source toward the optical disk. More specifically, the present invention relates to optical disk apparatuses that are provided with a mechanism for avoiding collisions between the optical disk and a condensing lens for condensing the light beam, when recording or reproducing information.

BACKGROUND ART

Conventional optical disk apparatuses reproduce information by irradiating a relatively weak light beam with a constant light amount onto an optical disk serving as an information carrier, and detecting the reflected light whose strength has been modulated by the optical disk. Moreover, information is recorded by irradiating a light beam whose light amount is modulated in accordance with the information to be recorded onto a recording material film on the optical disk (see for example JP S52-80802A).

In read-only optical disks, information is recorded in advance in a spiral shape with pits. Moreover, optical disks that can be recorded and reproduced are fabricated by forming a film made of an optically recordable/reproducible material (recording material film) by a method such as vapor deposition on a substrate surface having tracks of a spiral-shaped land-and-groove structure. In order to record information on the optical disk or to read information that has been recorded on the optical disk, a focus control is necessary that controls the focus of a light beam in a direction normal to the surface of the optical disk (referred to as "focus direction" in the following), such that the light beam is always in a predetermined converged state on the recording material film.

Referring to FIG. 14, the following is an explanation of the control operation of a conventional optical disk apparatus. As shown in FIG. 14, an optical head 110 includes a semiconductor laser 111, a coupling lens 112, a polarization beam splitter 113, a ¼ wavelength plate 114, a condensing lens 115 serving as a converging means, a focus actuator (referred to as "Fc actuator" in the following) 116 serving as a focus shifting means, a tracking actuator (referred to as "Tk actuator" in the following) 117 serving as a track shifting means, a detection lens 118, a cylindrical lens 119, and an optical detector 120.

The light beam that is emitted from the semiconductor laser 111 is converted into a parallel beam by the coupling lens 112. After this parallel beam has passed through the polarization beam splitter 113 and the ¼ wavelength plate 114, it is focused onto the information surface of the disk-shaped optical disk 101 by the condensing lens 115. Then, after the light beam reflected from the optical disk 101 has passed again through the condensing lens 115 and the ¼ wavelength plate 114, it is reflected by the polarization beam splitter 113. Then, after this reflected light beam has passed through the detection lens 118 and the cylindrical lens 119, it is irradiated onto the optical detector 120, which is partitioned into four sections. The condensing lens 115 is supported by an elastic member (not shown in the drawings), and is shifted by electromagnetic force in the focus direction, by letting an electrical current flow through the Fc actuator 116.

The optical detector 120 sends detected light amount signals to a focus error generator (referred to as "FE generator" in the following) 130 serving as a focus displacement signal detection means. The FE generator 130 uses the light amount signals from the optical detector 120 to calculate an error signal indicating the convergent state of the light beam on the information surface of the optical disk 101, that is, a focus error signal (referred to as "FE signal" in the following) corresponding to the positional displacement of the focus of the light beam with respect to the information surface of the optical disk 101. Then, the FE generator 130 sends this FE signal via a focus control filter (referred to as "Fc filter" in the following) 131, which performs a phase compensation, a driving selector 132, and a focus driver (referred to as "Fc driver" in the following) 137 to the Fc actuator 116, in order to stabilize the control operation of the focus control. The Fc actuator 116 drives the condensing lens 115 in the focus direction, such that the light beam converges in a predetermined state on the information surface of the optical disk 101.

A fixed driving signal generator 136 sends to the driving selector 132 a driving signal with which the Fc actuator 116 is mechanically put in its natural state, that is, a state in which no force is applied to the Fc actuator 116. If there is a positional displacement of the focus of the light beam with respect to the information surface of the optical disk 101, and this positional displacement needs to be corrected for the recording or reproducing of information, then the driving selector 132 sends the signal from the Fc filter 131 to the Fc driver 137. Based on the signal from the driving selector 132, the Fc driver 137 drives the Fc actuator 116. Then, the Fc actuator 116 drives the condensing lens 115 in a focus direction, such that the light beam converges on the information surface of the optical disk 101. In this state, it is said that "the focus control is in an operative state." If it is not necessary to correct positional displacements of the focus of the light beam with respect to the information surface of the optical disk 101, then the driving selector 132 sends the signal from the fixed driving signal generator 136 to the Fc driver 137. In this state, it is said that "the focus control is in a inoperative state." Based on the signal from the driving selector 132, the Fc driver 137 drives the Fc actuator 116. If the focus control is in the inoperative state, the Fc actuator 116 assumes its natural state.

The light amount signal from the optical detector 120 is also sent to the reflected light amount detector 161. Based on the light amount signal from the optical detector 120, the reflected light amount detector 161 detects a signal corresponding to the light amount reflected from the optical disk 101, and sends it to a focus anomaly detector (referred to as "Fc anomaly detector" in the following) 181. If the time for which the signal from the reflected light amount detector 161 is below a predetermined level continues for at least an anomaly detection time TW, then the internal status of the Fc anomaly detector 181 is set to a state indicating that the focus control has been lost. That is to say, the Fc anomaly detector 181 judges that a positional displacement of the focus of the light beam with respect to the information surface of the optical disk 101 has occurred.

As the density of optical disks increases, the optical disk and the condensing lens become closer when positioning the focus of the light beam on the information surface of the optical disk, and the risk of collisions between the optical disk and the condensing lens increases. The following two points are examples of the problems that may occur in this case:

(1) If the focus control is in the inoperative state, that is, if the optical disk apparatus is transported or moved, the condensing lens and the optical disk may collide easily.

(2) With the focus anomaly detection using the reflected light amount, the detection speed is slow, and the condensing lens and the optical disk may collide easily. In particular, if the optical head is moved to search the desired track with the focus of the light beam, or if external vibrations or shocks act on the optical disk apparatus, the focus control may be lost, and the condensing lens and the optical disk may collide.

DISCLOSURE OF THE INVENTION

To solve the problems of the related art, it is an object of the present invention to provide a highly reliable optical disk apparatus, with which collisions between the condensing lens and the optical disk can be avoided and scratches on the condensing lens or the optical disk can be prevented, regardless of whether the focus control is in the operative state or in the inoperative state.

In order to attain this object, a first configuration of an optical disk apparatus according to the present invention comprises:

a converging means for converging and irradiating a light beam from a light source toward a rotating information carrier;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier;

an information surface detection means for detecting whether the focus of the light beam is near the information surface of the information carrier, if the focus control means is in a inoperative state; and a collision evasion means for generating a driving signal for the focus shifting means such that the converging means is displaced in a direction away from the information carrier if a signal is generated by the information surface detection means.

With this first configuration of the optical disk apparatus, if the focus control means is in the inoperative state, the information carrier and the converging means do not become closer than in the state in which the focus of the light beam is positioned at the information surface of the information carrier, so that collisions between the information carrier and the converging means are avoided and scratches on the information carrier and the converging means can be prevented, and an optical disk apparatus with high reliability can be realized.

A second configuration of an optical disk apparatus according to the present invention comprises:

a converging means for converging and irradiating a light beam from a light source toward a rotating information carrier;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier;

a vibration detection means for detecting a vibration of the apparatus; and a collision evasion means for generating a driving signal for the focus shifting means such that the converging means is displaced in a direction away from the information carrier if a signal of at least a predetermined value is generated by the vibration detection means.

With this second configuration of the optical disk apparatus, in a state in which the possibility of collisions between the information carrier and the converging means due to vibrations of the apparatus is high, collisions between the information carrier and the converging means are avoided and scratches on the information carrier and the converging means can be prevented, and an optical disk apparatus with high reliability can be realized.

In the first or second configuration of the optical disk apparatus of the present invention, it is preferable that the driving signal generated by the collision evasion means is a two-value signal of a signal of a reference level and a signal of a constant level that is such that the converging means is displaced in the direction away from the information carrier. With this preferable example, collisions between the information carrier and the converging means can be avoided with a simple structure.

In the first or second configuration of the optical disk apparatus of the present invention, it is preferable that the driving signal generated by the collision evasion means is a pulse signal having a predetermined peak value such that the converging means is displaced in a direction away from the information carrier. With this preferable example, the time for which the driving signal of the collision evasion means is generated is short, so that collisions between the information carrier and the converging means can be avoided with low power consumption.

In the first or second configuration of the optical disk apparatus of the present invention, it is preferable that the driving signal generated by the collision evasion means is a ramp signal having a constant slope. With this preferable example, the driving signal generated by the collision evasion means becomes a continuous signal, so that collisions between the information carrier and the converging means can be avoided in a state in which the load on the converging means and the focus shifting means is reduced.

In the first or second configuration of the optical disk apparatus of the present invention, it is preferable that the driving signal generated by the collision evasion means if no signal is generated by the information surface detection means or the vibration detection means is a signal such that the converging means is displaced with a predetermined slope in a direction approaching the information carrier. With this preferable example, when the information carrier and the converging means are sufficiently spaced apart, the driving signal generated by the collision evasion means becomes small, so that collisions between the information carrier and the converging means can be avoided with low power consumption.

In these cases, it is preferable that the driving signal generated by the collision evasion means is saturated at an output of a preset predetermined value. With this preferable example, collisions between the information carrier and the converging means can be avoided while preventing the converging means or the focus shifting means being damaged due to the application of a large driving signal by the collision evasion means.

A third configuration of an optical disk apparatus according to the present invention comprises:

a converging means for converging and irradiating a light beam from a light source toward a rotating information carrier;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier; and a collision evasion means for constantly generating a driving signal for the focus shifting means such that the converging means is displaced in a direction away from the information carrier if the focus control means is in an inoperative state.

With this third configuration of the optical disk apparatus, if the focus control means is in the inoperative state, the positional relation between the information carrier and the converging means is always in a state in which no collisions occur, so that scratches on the information carrier or the converging means can be prevented, and an optical disk apparatus with high reliability can be realized.

A fourth configuration of an optical disk apparatus according to the present invention comprises:

a converging means for converging and irradiating a light beam from a light source toward an information carrier having a spiral-shaped track that has a tiny fluctuation in radial direction at a predetermined period;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier;

a fluctuation amplitude detection means for detecting an amplitude of the fluctuation of the track; and an anomaly detection means for judging, from an amplitude change over a predetermined time of a signal from the fluctuation amplitude detection means, whether the operation of the focus control means is anomalous, and generating a driving signal for the focus shifting means such that the converging means is displaced in a direction away from the information carrier.

With this fourth configuration of an optical disk apparatus, even for recording media that cannot employ a method of detecting whether the operation of the focus control means is anomalous from the amplitude of the reproduction signal obtained when reproducing information recorded on the information carrier, it can be detected swiftly whether the operation of the focus control means is anomalous, collisions between the information carrier and the converging means can be avoided, and scratches on the information carrier or the converging means can be prevented.

In the fourth configuration of the optical disk apparatus of the present invention, it is preferable that the fluctuation amplitude detection means is provided with a fluctuation detection sensitivity switching means for switching a detection sensitivity with which the amplitude of the fluctuation of the track is detected, depending on whether information is being recorded or information is being reproduced. With this preferable example, even when the output of the light beam changes and the light amount reflected from the information carrier changes depending on whether information is being recorded or information is being reproduced, the detection sensitivity of the fluctuation amplitude detection means can be switched depending on whether information is recorded or information is reproduced, thus canceling changes in the reflected light amount, so that erroneous detections with the anomaly detection means can be prevented.

In the fourth configuration of the optical disk apparatus of the present invention, it is preferable that the anomaly detection means is provided with an anomaly level switching means for switching a signal change level of the fluctuation amplitude detection means at which anomaly is judged, depending on whether information is being recorded or information is being reproduced. With this preferable example, even when the output of the light beam changes and the light amount reflected from the information carrier changes depending on whether information is being recorded or information is being reproduced, and the signal from the fluctuation amplitude detection means changes, the signal change level of the fluctuation amplitude detection means at which anomaly is judged can be switched depending on whether information is being recorded or information is being reproduced, thus canceling changes in the signal from the fluctuation amplitude detection means, so that erroneous detections with the anomaly detection means can be prevented.

It is preferable that the fourth configuration of the optical disk apparatus of the present invention further comprises a recorded region detection means for detecting whether a region onto which the light beam is irradiated is in a recorded or an unrecorded state, and a fluctuation detection sensitivity switching means for switching a detection sensitivity of the fluctuation amplitude detection means in accordance with a detection result of the recorded region detection means. With this preferable example, even when the light amount reflected from the information carrier changes depending on whether the region on which the light beam is irradiated is in a recorded or an unrecorded state, the detection sensitivity of the fluctuation amplitude detection means can be switched depending on whether the region on which the light beam is irradiated is in a recorded or an unrecorded state, thus canceling changes in the reflected light amount, so that erroneous detections with the anomaly detection means can be prevented.

It is preferable that the fourth configuration of the optical disk apparatus of the present invention further comprises a recorded region detection means for detecting whether a region onto which the light beam is irradiated is in a recorded or an unrecorded state, and an anomalous level switching means for switching a signal change level of the fluctuation amplitude detection means at which anomaly is judged in accordance with a detection result of the recorded region detection means. With this preferable example, even when the light amount reflected from the information carrier changes depending on whether the region on which the light beam is irradiated is in a recorded or an unrecorded state, and the signal from the fluctuation amplitude detection means changes, the signal change level of the fluctuation amplitude detection means at which anomaly is judged can be switched depending on whether the region on which the light beam is irradiated is in a recorded or an unrecorded state, thus canceling changes in the signal from the fluctuation amplitude detection means, so that erroneous detections with the anomaly detection means can be prevented.

It is preferable that the fourth configuration of the optical disk apparatus of the present invention further comprises a track displacement signal detection means that generates a signal in accordance with a positional displacement of the focus of the light beam with respect to the track of the information carrier; a track shifting means for shifting the converging means in a direction traverse to the track of the information carrier; and a tracking control means for driving the track shifting means in accordance with the signal from the track displacement signal detection means and performing a control such that the focus of the light beam follows the track of the information carrier; wherein the anomaly detection means operates only when the tracking control means is in an operative state. With this preferable example, if the tracking control means is in the inoperative state, erroneous detection with the anomaly detection means due to disturbance of the signal from the fluctuation amplitude detection means or the signal from the focus displacement signal detection means can be prevented.

It is preferable that the fourth configuration of the optical disk apparatus of the present invention further comprises a track displacement signal detection means that generates a signal in accordance with a positional displacement of a focus of the light beam with respect to the track of the information carrier; a track shifting means for shifting the converging means in a direction traverse to the track of the information carrier; and a tracking control means for driving the track shifting means in accordance with the signal from the track displacement signal detection means and performing a control such that the focus of the light beam follows the track of the information carrier; wherein the anomaly detection means switches the detection time or the amplitude change level of the signal amplitude change of the fluctuation amplitude detection means at which it is judged that the operation of the focus control means is anomalous, depending on whether the tracking control means is in an operative state or an inoperative state. With this preferable example, if the tracking control means is in the inoperative state, erroneous detection with the anomaly detection means due to disturbance of the signal from the fluctuation amplitude detection means or the signal from the focus displacement signal detection means can be prevented.

A fifth configuration of an optical disk apparatus according to the present invention comprises:

a converging means for converging and irradiating a light beam from a light source toward a rotating information carrier;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier; and an anomaly detection means for judging that the operation of the focus control means is anomalous when a change in the signal from the focus displacement signal detection means over a predetermined time is within a predetermined range, and generating a driving signal for the focus shifting means that is such that the converging means is displaced in a direction away from the information carrier.

With this fifth configuration of an optical disk apparatus, even for recording media that cannot employ a method of detecting whether the operation of the focus control means is anomalous from the amplitude of the reproduction signal obtained when reproducing information recorded on the information carrier, it can be detected swiftly whether the operation of the focus control means is anomalous, collisions between the information carrier and the converging means can be avoided, and scratches on the information carrier or the converging means can be prevented.

It is preferable that the fifth configuration of the optical disk apparatus of the present invention further comprises a multiplication means for multiplying the signal from the focus displacement signal detection means with a predetermined value; and a gain switching means for switching a multiplication factor of the multiplication means, depending on whether information is being recorded or information is being reproduced. With this preferable example, even if the output of the light beam changes and the amount of light reflected from the information carrier changes depending on whether information is being recorded or information is being reproduced, the multiplication factor of the multiplication means can be changed depending on whether information is being recorded or information is being reproduced, thus canceling changes in the amount of reflected light, so that erroneous detection with the anomaly detection means can be prevented.

In the fifth configuration of the optical disk apparatus of the present invention, it is preferable that the anomaly detection means further comprises a judgment level switching means for switching, depending on whether information is being recorded or information is being reproduced, a signal level at which the signal of the focus displacement signal detection means that is compared with that signal level is judged to be anomalous. With this preferable example, even if the output of the light beam changes, the amount of light reflected from the information carrier changes, and the signal from the focus displacement signal detection means changes depending on whether information is being recorded or information is being reproduced, the signal level of the judgment level switching means can be switched depending on whether information is being recorded or information is being reproduced, thus canceling changes in the signal from the focus displacement signal detection means, so that erroneous detection with the anomaly detection means can be prevented.

It is preferable that the fifth configuration of the optical disk apparatus of the present invention further comprises a multiplication means for multiplying the signal from the focus displacement signal detection means with a predetermined value; a recorded region detection means for detecting whether a region onto which the light beam is irradiated is in a recorded or an unrecorded state; and a gain switching means for switching a multiplication factor of the multiplication means, in accordance with a detection result of the recorded region detection means. With this preferable example, even if the amount of light reflected from the information carrier changes depending on whether the region onto which the light beam is irradiated is in a recorded or an unrecorded state, the multiplication factor of the multiplication means can be switched depending on whether the region onto which the light beam is irradiated is in a recorded or an unrecorded state, thus canceling changes in the amount of reflected light, so that erroneous detection with the anomaly detection means can be prevented.

It is preferable that the fifth configuration of the optical disk apparatus of the present invention further comprises a recorded region detection means for detecting whether a region onto which the light beam is irradiated is in a recorded or an unrecorded state; and a judgment level switching means for switching, in accordance with a detection result of the recorded region detection means, a signal level at which the signal of the focus displacement signal detection means that is compared with that signal level is judged to be anomalous. With this preferable example, even if the amount of light reflected from the information carrier changes and the signal from the focus displacement signal detection means changes depending on whether the region onto which the light beam is irradiated is in a recorded or an unrecorded state, the signal level of the judgment level switching means can be switched depending on whether the region onto which the light beam is irradiated is in a recorded or an unrecorded state, thus canceling changes in the signal from the focus displacement signal detection means, so that erroneous detection with the anomaly detection means can be prevented.

It is preferable that the fifth configuration of the optical disk apparatus of the present invention further comprises a track displacement signal detection means that generates a signal in accordance with a positional displacement of a focus of the light beam with respect to the track of the information carrier; a track shifting means for shifting the converging means in a direction traverse to the track of the information carrier; and a tracking control means for driving the track shifting means in accordance with the signal from the track displacement signal detection means and performing a control such that the focus of the light beam follows the track of the information carrier; wherein the anomaly detection means operates only when the tracking control means is in an operative state.

A sixth configuration of an optical disk apparatus according to the present invention comprises:

a converging means for converging and irradiating a light beam from a light source toward a rotating information carrier;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier;

a focus integration means for integrating the signal from the focus displacement signal detection means when a change of the signal from the focus displacement signal detection means is within a predetermined range;

a clearing means for clearing an integration value of the focus integration means when the change of the signal from the focus displacement signal detection means exceeds the predetermined range; and an anomaly detection means for judging that the operation of the focus control means is anomalous when the absolute value of the integration value of the focus integration means is at least a predetermined value, and generating a driving signal for the focus shifting means that is such that the converging means is displaced in a direction away from the information carrier.

With this sixth configuration of an optical disk apparatus, even for recording media that cannot employ a method of detecting whether the operation of the focus control means is anomalous from the amplitude of the reproduction signal obtained when reproducing information recorded on the information carrier, it can be detected swiftly whether the operation of the focus control means is anomalous, collisions between the information carrier and the converging means can be avoided, and scratches on the information carrier or the converging means can be prevented.

In the sixth configuration of the optical disk apparatus of the present invention, it is preferable that the focus integration means comprises a multiplication means for multiplying the signal from the focus displacement signal detection means with at least two kinds of multiplication factors, corresponding to the case that information is being recorded and the case that information is being reproduced, and wherein the result of the multiplication with the multiplication means is integrated. With this preferable example, even if the output of the light beam changes and the amount of light reflected from the information carrier changes depending on whether information is being recorded or information is being reproduced, the multiplication factor multiplied with the signal from the focus displacement signal detection means can be switched depending on whether information is being recorded or information is being reproduced, thus canceling changes in the amount of reflected light, so that erroneous detection with the anomaly detection means can be prevented.

In the sixth configuration of the optical disk apparatus of the present invention, it is preferable that the clearing means switches the range over which the change of the signal from the focus displacement signal detection means is detected and compared, depending on whether information is being recorded or information is being reproduced. With this preferable example, even if the output of the light beam changes, the amount of light reflected from the information carrier changes and the signal from the focus displacement signal detection means changes depending on whether information is being recorded or information is being reproduced, the range over which the change of the signal from the focus displacement signal detection means is detected and compared can be switched, thus canceling changes in the signal from the focus displacement signal detection means, so that erroneous detection with the anomaly detection means can be prevented.

It is preferable that the sixth configuration of the optical disk apparatus of the present invention further comprises a multiplication means for multiplying the signal from the focus displacement signal detection means with a predetermined value; a recorded region detection means for detecting whether a region onto which the light beam is irradiated is in a recorded or an unrecorded state; and a gain switching means for switching a multiplication factor of the multiplication means, in accordance with a detection result of the recorded region detection means. With this preferable example, even if the amount of light reflected from the information carrier changes depending on whether the region onto which the light beam is irradiated is in a recorded or an unrecorded state, the multiplication factor of the multiplication means can be switched depending on whether the region onto which the light beam is irradiated is in a recorded or an unrecorded state, thus canceling changes in the reflected light amount, so that erroneous detection with the anomaly detection means can be prevented.

It is preferable that the sixth configuration of the optical disk apparatus of the present invention further comprises a recorded region detection means for detecting whether a region onto which the light beam is irradiated is in a recorded or an unrecorded state; wherein the clearing means switches the range over which the change of the signal from the focus displacement signal detection means is detected and compared, depending on a detection result of the recorded region detection means. With this preferable example, even if the amount of light reflected from the information carrier changes and the signal from the focus displacement signal detection means changes depending on whether the region onto which the light beam is irradiated is in a recorded or an unrecorded state, the range over which the change of the signal from the focus displacement signal detection means is detected and compared can be switched depending on whether the region onto which the light beam is irradiated is in a recorded or an unrecorded state, thus canceling changes in the signal from the focus displacement signal detection means, so that erroneous detection with the anomaly detection means can be prevented.

A seventh configuration of an optical disk apparatus according to the present invention comprises:

a converging means for converging and irradiating a light beam from a light source toward a rotating information carrier;

an optical detection means for partitioning and receiving the light beam reflected by the information carrier;

a focus displacement signal detection means for generating a signal in accordance with a positional displacement of a focus of the light beam with respect to an information surface of the information carrier, by calculating a differential of partitioned regions of the optical detection means;

a focus shifting means for shifting the converging means in a direction normal to the information surface of the information carrier;

an offset application means for applying an offset to the signal from the focus displacement signal detection means;

a focus control means for driving the focus shifting means in accordance with the signal from the focus displacement signal detection means and the offset application means, and performing a control such that the focus of the light beam follows the information surface of the information carrier; and a vibration detection means for detecting a vibration of the apparatus;

wherein, based on the signals from the vibration detection means, the offset application means applies such an offset that the converging means is displaced in a direction away from the information carrier.

With this seventh configuration of the optical disk apparatus, if the focus control means assumes an anomalous state, and vibrations act on the apparatus during the time until the anomalous state is detected, the focus control means generates a driving signal that is such that the converging means is displaced in a direction away from the information carrier, so that collisions between the information carrier and the converging means can be avoided, scratches on the information carrier or the converging means can be prevented, and an optical disk apparatus with high reliability can be realized.

In the seventh configuration of the optical disk apparatus of the present invention, it is preferable that the offset application means makes the applied offset amount larger, the larger the signal from the vibration detection means is. With this preferable example, the focus control means generates a driving signal that is such that the converging means is displaced further away from the information carrier, the larger the vibration acting on the apparatus is, so that collisions between the information carrier and the converging means can be avoided reliably.

In the seventh configuration of the optical disk apparatus of the present invention, it is preferable that the focus displacement signal detection means is provided with a balance multiplication means that applies individual gains to the signals before the differential calculation, and wherein the balance multiplication means switches the gains such that an operating point of the focus control means does not change, in accordance with the offset applied by the offset application means. With this preferable example, the focus control means generates a driving signal that is such that the converging means is displaced further away from the information carrier, without changing the operating point, so that collisions between the information carrier and the converging means can be avoided reliably.

In the seventh configuration of the optical disk apparatus of the present invention, it is preferable that the offset applied by the offset application means is saturated at a predetermined level. With this preferable example, collisions between the information carrier and the converging means can be avoided while preventing damage to the converging means or the focus shifting means due to the application of a large driving signal.

An eighth configuration of an optical disk apparatus according to the present invention comprises:

a converging means for converging and irradiating a light beam from a light source toward a rotating information carrier;

a focus displacement signal detection means for generating a signal in accordance with a positional displacement of a focus of the light beam with respect to an information surface of the information carrier;

a focus shifting means for shifting the converging means in a direction normal to the information surface of the information carrier;

a focus control means for driving the focus shifting means in accordance with the signal from the focus displacement signal detection means, and performing a control such that the focus of the light beam follows the information surface of the information carrier; and a search means for shifting the converging means such that the light beam is irradiated onto a desired track on the information carrier;

wherein the search means sets the focus control means to an inoperative state when the focus control means is operative.

With this eighth configuration of the optical disk apparatus, if the search means is in a state in which the possibility of collisions between the information carrier and the converging means due to vibrations during the search operation is high, then collisions between the information carrier and the converging means can be avoided, scratches on the information carrier or the converging means can be prevented, and an optical disk apparatus with high reliability can be realized.

In the eighth configuration of the optical disk apparatus of the present invention, it is preferable that the search means sets the focus control means to an inoperative state if the number of tracks across which the focus of the light beam is shifted is a predetermined number or greater. With this preferable example, if the search means is in a state in which the possibility of collisions between the information carrier and the converging means due to large vibrations occurring during a long search operation is high, then collisions between the information carrier and the converging means can be avoided.

In the eighth configuration of the optical disk apparatus of the present invention, it is preferable that the search means sets the focus control means to an inoperative state if the direction in which the focus of the light beam is shifted across the tracks is a direction toward the outer periphery of the information carrier. With this preferable example, if it is in a state in which there is a high possibility of collisions between the information carrier and the converging means due to large vibrations occurring during a search operation in the direction toward the outer periphery of an information carrier with a high possibility of collisions between the information carrier and the converging means due to the influence of surface fluctuations of the information carrier or the like, then collisions between the information carrier and the converging means can be avoided.

In the eighth configuration of the optical disk apparatus of the present invention, it is preferable that the search means sets the focus control means to an inoperative state if a target track to which the focus of the light beam is to be shifted transversely is within a range of a predetermined distance from the outermost periphery of the information carrier. Also with this preferable example, if it is in a state in which there is a high possibility of collisions between the information carrier and the converging means due to large vibrations occurring during a search operation in the direction toward the outer periphery of an information carrier with a high possibility of collisions between the information carrier and the converging means due to the influence of surface fluctuations of the information carrier or the like, then collisions between the information carrier and the converging means can be avoided.

BRIEF DESCRIPTION OF THE DRAWINGS

FIG. 7 shows the signal of the FE generator for the case that the focus of the light beam has passed in the focus direction through the information surface of the optical disk in the third embodiment of the present invention.

FIG. 8A shows the signal that is output from the FE generator in the third embodiment of the present invention, FIG. 8B shows the signal that is output from the recording operation indicator in the third embodiment of the present invention, FIG. 8C shows the signal that is output from the recording region detector in the third embodiment of the present invention, and FIG. 8D shows the signal that is output from the variable multiplier in the third embodiment of the present invention.

BEST MODE FOR CARRYING OUT THE INVENTION

The following is a more detailed description of the present invention, with reference to embodiments.

FIRST EMBODIMENT

Figure 1:
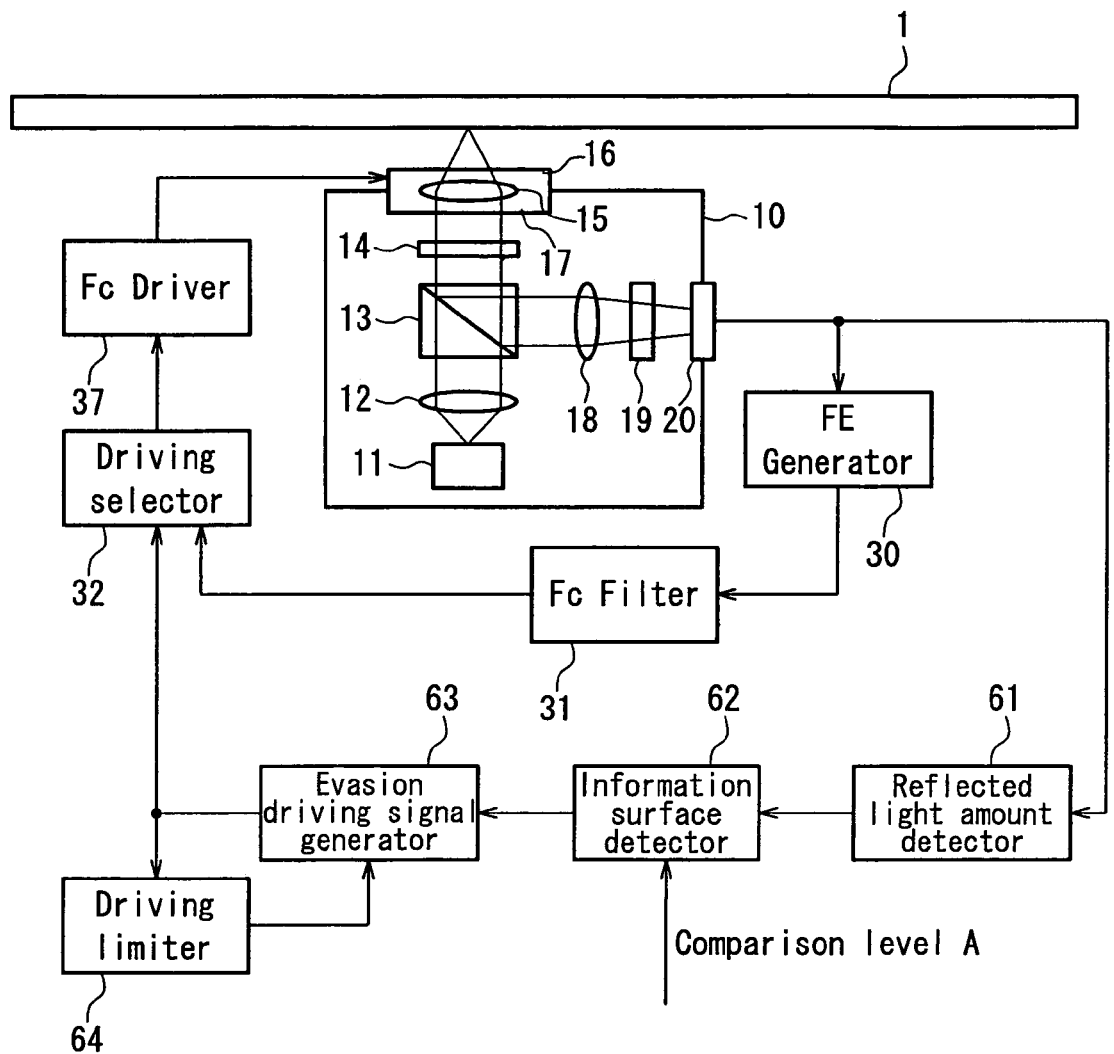
FIG. 1 is a block diagram showing an optical disk apparatus according to a first embodiment of the present invention.

FIG. 1 is a block diagram showing an optical disk apparatus according to a first embodiment of the present invention.

As shown in FIG. 1, an optical head 10 includes a semiconductor laser 11 serving as a light source, a coupling lens 12, a polarization beam splitter 13, a ¼ wavelength plate 14, a condensing lens 15 serving as a converging means that converges and irradiates a light beam coming from the light source toward a rotating disk-shaped optical disk 1 serving as a information carrier, a focus actuator (referred to as "Fc actuator" in the following) 16 serving as a focus shifting means for shifting the condensing lens 15 in a direction normal to the information surface of the optical disk 1, a tracking actuator (referred to as "Tk actuator" in the following) 17 serving as a track shifting means for shifting the condensing lens 15 in a direction transverse to the tracks on the optical disk 1, a detection lens 18, a cylindrical lens 19, and an optical detector 20.

The light beam emitted from the semiconductor laser 11 is converted into a parallel beam by the coupling lens 12. After this parallel beam has passed through the polarization beam splitter 13 and the ¼ wavelength plate 14, it is focused onto the information surface of the optical disk 1 by the condensing lens 15.

After the light beam reflected from the optical disk 1 has passed again through the condensing lens 15 and the ¼ wavelength plate 14, it is reflected by the polarization beam splitter 13. Then, after this reflected light beam has passed through the detection lens 18 and the cylindrical lens 19, it is irradiated onto the optical detector 20, which is partitioned into four sections. The condensing lens 15 is supported by an elastic member (not shown in the drawings), and is shifted by electromagnetic force in the focus direction, by letting an electrical current flow through the Fc actuator 16.

The optical detector 20 sends the detected light amount signals to a focus error generator (referred to as "FE generator" in the following) 30 serving as a focus displacement signal detection means for generating a signal corresponding to the positional displacement of the focus of the light beam with respect to the information surface of the optical disk 1. The FE generator 30 uses the light amount signals from the optical detector 20 to calculate an error signal indicating the convergent state of the light beam on the information surface of the optical disk 1, that is, a focus error signal (referred to as "FE signal" in the following) corresponding to the positional displacement of the focus of the light beam with respect to the information surface of the optical disk 1. Then, the FE generator 30 sends this FE signal via a focus control filter (referred to as "Fc filter" in the following) 31, which performs a phase compensation, a driving selector 32, and a focus driver (referred to as "Fc driver" in the following) 37 to the Fc actuator 16, in order to stabilize the control operation of the focus control. The Fc actuator 16 drives the condensing lens 15 in the focus direction, such that the light beam converges in a predetermined state on the information surface of the optical disk 1.

A reflected light amount detector 61 and an information surface detector 62 constitute an information surface detection means for detecting whether the focus of the light beam is near the information surface of the optical disk 1. The light amount signal of the optical detector 20 is sent to the reflected light amount detector 61. Based on the light amount signal from the optical detector 20, the reflected light amount detector 61 detects a signal corresponding to the light amount reflected from the optical disk 1 (reflected light amount signal), and sends it to the information surface detector 62. The information surface detector 62 can be configured with a comparator or the like. If the reflected light amount signal from the reflected light amount detector 61 is greater than a comparison level A, then the information surface detector 62 sends a high-level signal, and if it is lower than the comparison level A, then the information surface detector 62 sends a low-level signal to an evasion driving signal generator 63 serving as a collision evasion means.

A driving limiter 64 sends to the evasion driving signal generator 63 a signal for restricting the signal from the evasion driving signal generator 63 such that it does not become greater than zero-level. If the signal from the driving limiter 64 is low-level, then the evasion driving signal generator 63 generates a driving signal such that the condensing lens 15 is displaced at a predetermined speed (slope) away from the optical disk 1 when the signal from the information surface detector 62 is high-level, and generates a driving signal such that the condensing lens 15 is displaced at a predetermined speed (slope) toward the optical disk 1 when the signal from the information surface detector 62 is low-level. Then, the evasion driving signal generator 63 sends the generated driving signal to the driving selector 32 and the driving limiter 64.

If the signal from the driving limiter 64 is high-level, then the evasion driving signal generator 63 clears the output driving signal to zero, and sends the generated driving signal to the driving selector 32 and the driving limiter 64. The driving limiter 64 sends to the evasion driving signal generator 63 a high-level signal if the driving signal from the evasion driving signal generator 63 is zero or greater, and a low-level signal if the driving signal from the evasion driving signal generator 63 is smaller than zero. The driving selector 32 performs signal switching such that the signal from the Fc filter 31 is sent via the Fc driver 37 to the Fc actuator 16 if the focus control is in the operative state, and the signal from the evasion driving signal generator 63 is sent via the Fc driver 37 to the Fc actuator 16 if the focus control is in the inoperative state.

Referring to FIG. 2, the following is an explanation of the operation of collision evasion between the condensing lens 15 and the optical disk 1 if the focus control is in the inoperative state. FIG. 2A shows the reflected light amount signal that is output from the reflected light amount detector 61, FIG. 2B shows the signal that is output from the information surface detector 62, FIG. 2C shows the driving signal that is output from the evasion driving signal generator 63, and FIG. 2D shows the signal that is output from the driving limiter 64. FIG. 2E shows the positional relation between the optical disk 1 (indicated by the broken line) and the condensing lens (indicated by the solid line).

Figure 2A:
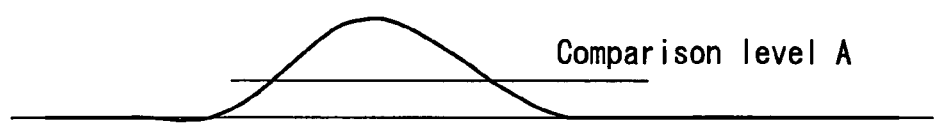
FIG. 2A shows the signal that is output from the reflected light amount detector in the first embodiment of the present invention.

If the focus control is in the inoperative state, the driving selector 32 constantly sends the signal from the evasion driving signal generator 63 to the Fc actuator 16. Since the focus control is in the inoperative state, the distance between the condensing lens 15 and the optical disk 1 changes depending on surface fluctuations of the optical disk 1 or the like. When the condensing lens 15 and the optical disk 1 come close to one another, and the focus of the light beam thus comes close to the information surface of the optical disk 1, the reflected light amount signal that is output from the reflected light amount detector 61 increases, as shown in FIG. 2A. When the focus of the light beam becomes even closer to the information surface of the optical disk 1, and the reflected light amount signal that is output from the reflected light amount detector 61 exceeds a reference level A, the signal that is output from the information surface detector 62 becomes high-level, as shown in FIG. 2B.

Figure 2B:
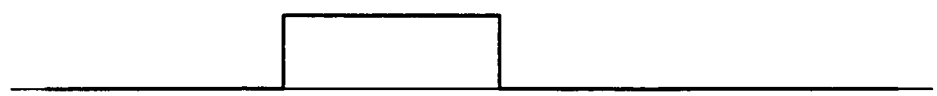
FIG. 2B shows the signal that is output from the information surface detector in the first embodiment of the present invention.
Figure 2C:
FIG. 2C shows the signal that is output from the evasion driving signal generator in the first embodiment of the present invention.

When the signal that is output from the information surface detector 62 has become high-level, the evasion driving signal generator 63 generates a driving signal for the Fc actuator 16, such that the condensing lens 15 is displaced in a direction away from the optical disk 1, as shown in FIG. 2C. Thus, the condensing lens 15 and the optical disk 1 gradually move away from one another, and the reflected light amount signal that is output from the reflected light amount detector 61 decreases, as shown in FIG. 2A.

When the condensing lens 15 and the optical disk 1 are more than a predetermined distance apart, and the reflected light amount signal that is output from the reflected light amount detector 61 becomes lower than the comparison level A, then, the signal that is output from the information surface detector 62 becomes low-level, as shown in FIG. 2B. When the signal that is output from the information surface detector 62 becomes low-level, the evasion driving signal generator 63 generates a driving signal for the Fc actuator 16, such that the condensing lens 15 is displaced in a direction toward the optical disk 1, as shown in FIG. 2C.

Figure 2D:
FIG. 2D shows the signal that is output from the driving limiter in the first embodiment of the present invention.
Figure 2E:
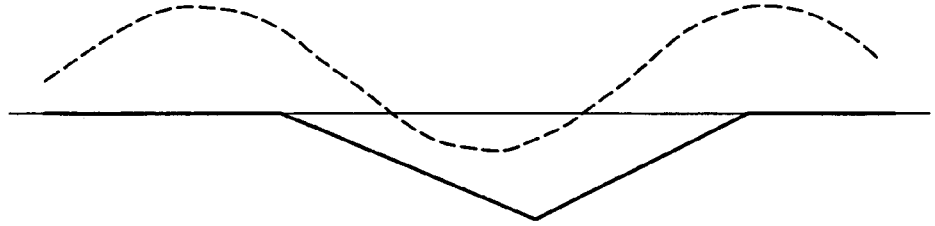
FIG. 2E shows the positional relation between the optical disk and the condensing lens in the first embodiment of the present invention.

When the driving signal that is output from the evasion driving signal generator 63 (see FIG. 2C) becomes zero, the signal that is output from the driving limiter 64 becomes high-level, as shown in FIG. 2D. Then, as shown in FIG. 2C and FIG. 2D, if the signal that is output from the driving limiter 64 is high-level, the driving signal that is output from the evasion driving signal generator 63 takes on a constant value that does not become greater than zero.

Thus, when the condensing lens 15 and the optical disk 1 approach one another, the condensing lens 15 is driven such that it is displaced in a direction away from the optical disk 1, so that collisions between the condensing lens 15 and the optical disk 1 can be avoided.

It should be noted that in the present embodiment, the extent to which the condensing lens 15 and the optical disk 1 have approached one another is detected using the reflected light amount, but the present invention is not necessarily limited to this configuration. It is also possible to detect the extent to which the condensing lens 15 and the optical disk 1 have approached one another using, for example, the amplitude of the signal recorded on the information surface of the optical disk 1, the amplitude of the FE signal serving as the error signal used by the focus control, or the amplitude of a tracking error signal (referred to in the following as "TE signal") serving as the error signal used for the tracking control.

Figure 4A:
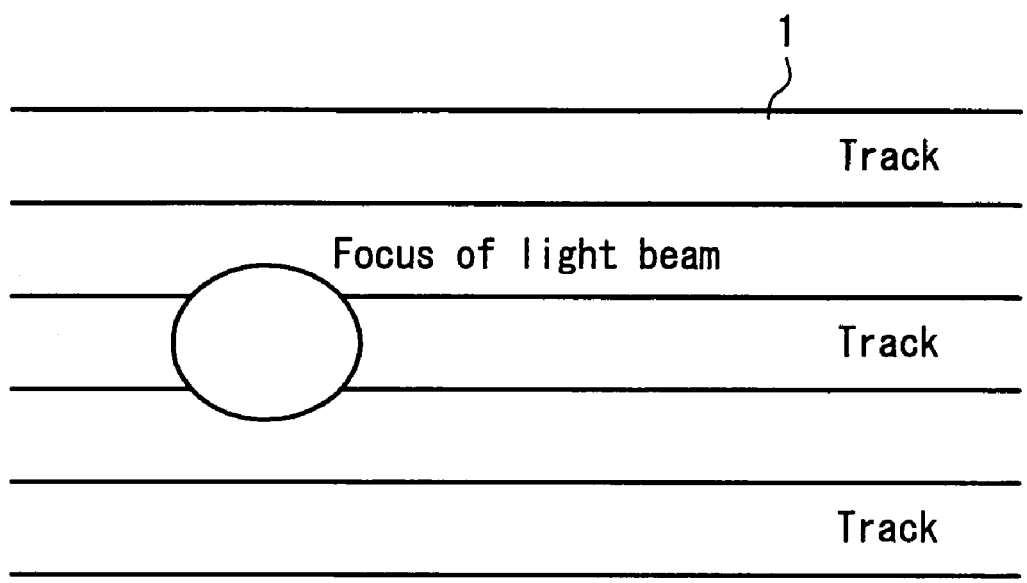
FIG. 4A is a magnified view showing an optical disk for the case that there is no wobble in the second embodiment of the present invention.
Figure 4B:
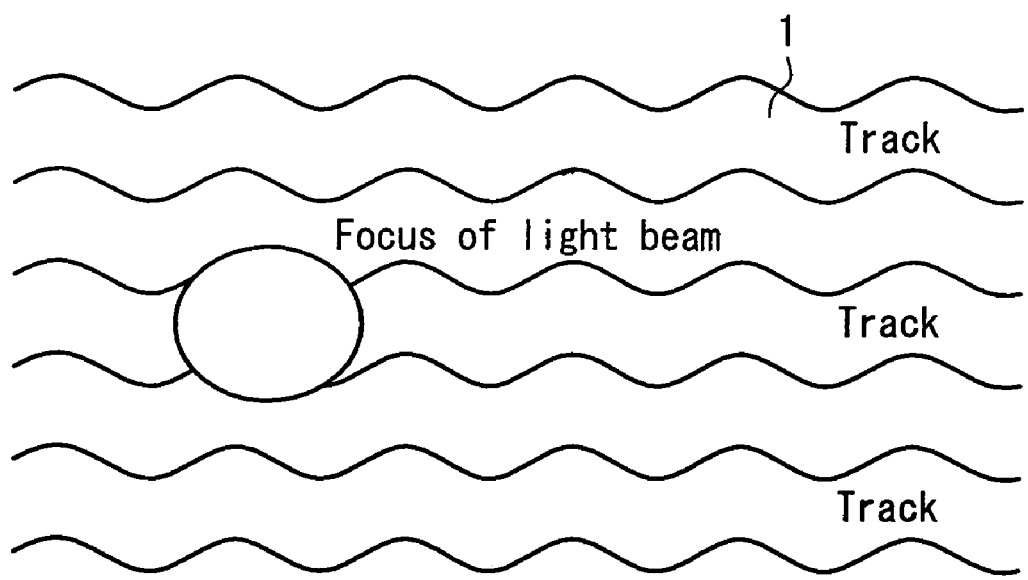
FIG. 4B is a magnified view showing an optical disk for the case that there is wobble in the second embodiment of the present invention.

Moreover, if the information surface of the optical disk 1 is made of tracks with wobble as shown in FIG. 4B, then a signal corresponding to the wobble component of the tracks may be detected by the information surface detector 62, and that the distance between the condensing lens 15 and the optical disk 1 has become close may be detected using the amplitude of that signal. Moreover, it is also possible to configure the information surface detector 62 by attaching a position sensor to the optical head 10, and to directly detect the distance to the optical disk 1.

It is also possible to devise a configuration in which an acceleration sensor serving as a vibration detection means is attached to the casing of the overall apparatus, the detected acceleration signal, that is, a signal corresponding to an external vibration is detected, and the evasion driving signal generator 63 foresees when the distance between the condensing lens 15 and the optical disk 1 becomes close to vibrations and generates a driving signal such that a collision between them is avoided.

Moreover, the present embodiment is configured such that when the condensing lens 15 and the optical disk 1 start to become close to one another, a triangular driving signal decreasing with a constant slope, and when they then start to move away from one another, a triangular driving signal increasing with a constant slope is output from the evasion driving signal generator 63 (see FIG. 2C), but the present invention is not necessarily limited to this configuration. For example, the same effect can also be attained with a configuration in which a pulse signal having a predetermined peak value such that the condensing lens 15 is displaced in a direction away from the optical disk 1 is output from the evasion driving signal generator 63. And the same effect can also be attained with a configuration in which a ramp signal having a constant slope is output from the evasion driving signal generator 63.

The driving signal that is output from the evasion driving signal generator 63 is saturated at a preset predetermined value due to the action of the driving limiter 64. Therefore, more than the necessary current will not flow through the Fc actuator 16 due to the driving signal that is output from the evasion driving signal generator 63. As a result, more than the necessary heat is not generated by the Fc actuator 16, so that damage to the optical head 10 can be prevented.

Furthermore, the same effect can also be attained with a configuration in which the evasion driving signal generator 63 outputs a two-value signal with a reference level corresponding to the case that the condensing lens 15 and the optical disk 1 are away from one another, and a very low constant level at which the condensing lens 15 does not collide with the optical disk 1 when the condensing lens 15 and the optical disk have become close to one another.

In the present embodiment, when the focus control is in the inoperative state, and the condensing lens 15 has moved close to the optical disk 1, the evasion driving signal generator 63 generates a driving signal such that the condensing lens 15 is displaced with a predetermined speed in a direction away from the optical disk 1, but there is no limitation to this configuration. For example, collisions between the condensing lens 15 and the optical lens 1 when the focus control is in the inoperative state can be reliably prevented with a configuration in which the evasion driving signal generator 63 outputs a very low constant signal such that the condensing lens 15 is constantly displaced from the optical disk 1 if the focus control is inoperative, even when the condensing lens 15 is not approaching the optical disk 1.

SECOND EMBODIMENT

Figure 3:
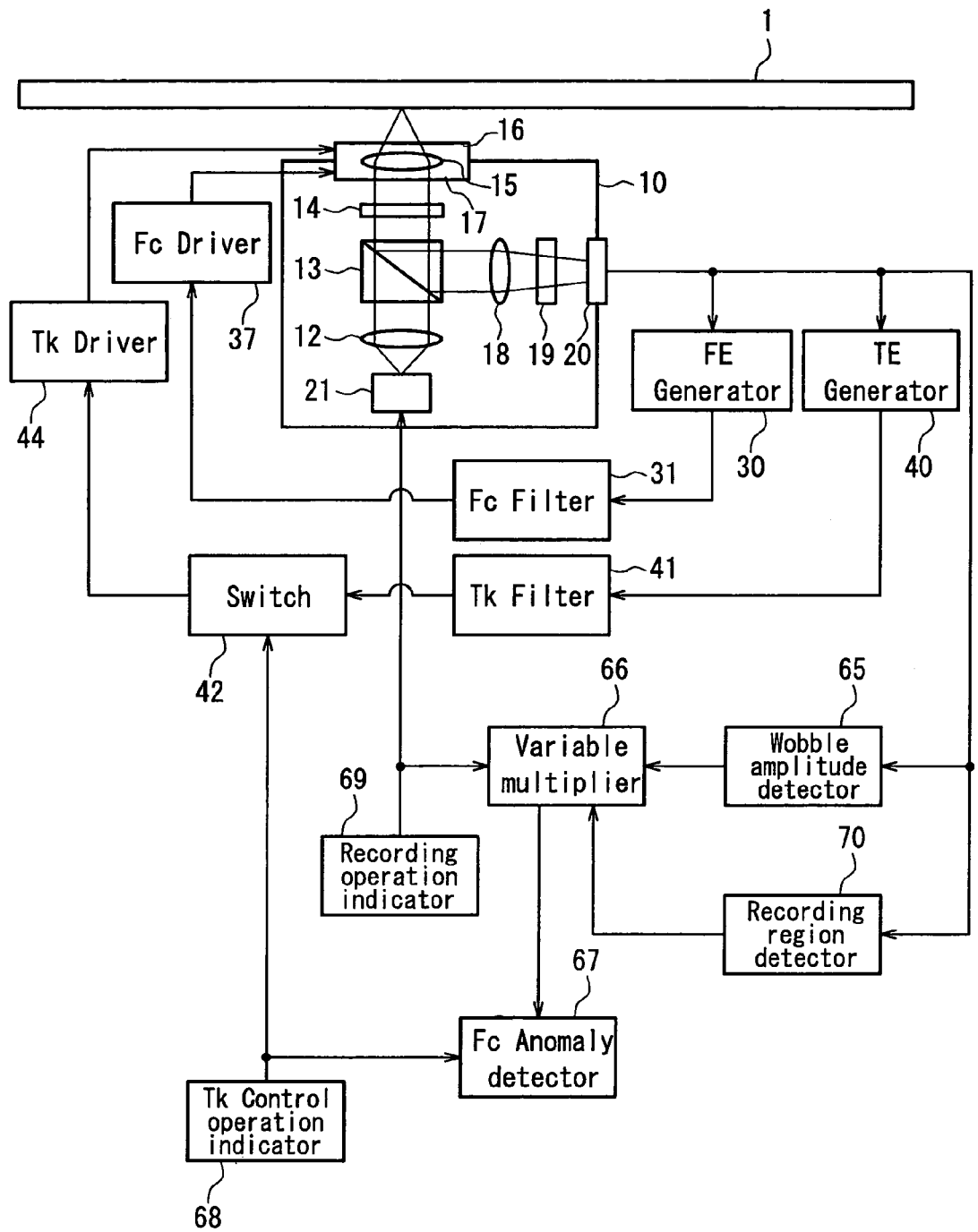
FIG. 3 is a block diagram showing an optical disk apparatus according to a second embodiment of the present invention.

FIG. 3 is a block diagram showing an optical disk apparatus according to a second embodiment of the present invention. It should be noted that structural elements that are the same as in FIG. 1 of the first embodiment have been denoted by the same numerals, and their further explanation has been omitted.

As shown in FIG. 3, in the present embodiment, a variable power laser 21 is used as the semiconductor laser. Moreover, in the optical disk apparatus of the present embodiment, the FE generator 30 sends the FE signal via the Fc filter 31 and the Fc driver 37 to the Fc actuator 16. That is to say, different from the first embodiment, the FE signal from the FE generator 30 is sent to the Fc actuator 16 not via the driving selector 32 (see FIG. 1), but only via the Fc filter 31 and the Fc driver 37.

The optical detector 20 sends the detected light amount signal to the FE generator 30, a tracking error generator (referred to as "TE generator" in the following) 40, a wobble amplitude detector 65, and a recording region detector 70. The TE generator 40 serves as a track displacement signal detection means for generating a signal corresponding to the positional displacement of the focus of the light beam with respect to the track on the optical disk 1. The wobble amplitude detector 65 serves as a fluctuation amplitude detection means for detecting an amplitude of the fluctuation in the spiral-shaped track, which has a tiny fluctuation in the radial direction at a predetermined period, on the optical disk 1. The recording region detector 70 serves as a recorded region detection means for detecting whether the region irradiated by the light beam is in a recorded or an unrecorded state.

The TE generator 40 calculates a tracking error signal (referred to as "TE signal" in the following) that corresponds to the positional displacement between the focus of the light beam and the track on the optical disk 1, using the light amount signal from the optical detector 20. Then, the TE generator 40 sends this TE signal to a tracking control filter 41 (referred to as "Tk filter" in the following) serving as a tracking control means. Based on the TE signal from the TE generator 40, the Tk filter 41 sends a driving signal causing the focus of the light beam to follow the track to the Tk actuator 17, via the switch 42 and a tracking driver (referred to as "Tk driver" in the following) 44.

The Tk actuator 17 moves the condensing lens 15 in the radial direction of the optical disk 1, in accordance with the driving signal from the Tk driver 44. A tracking control operation indicator (referred to as "Tk control operation indicator" in the following) 68 sends to a focus anomaly detector (referred to as "Fc anomaly detector") 67, which serves as an anomaly detection means, and the switch 42 a high-level signal when tracking control is performed, and a low-level signal when tracking control is not being performed.

The switch 42 sends the signal from the Tk filter 41 to the Tk actuator 17 if the signal from the Tk control operation indicator 68 is high-level, and sends a zero to the Tk actuator 17 if the signal from the Tk control operation indicator 68 is low-level.

Referring to FIG. 4, the following is an explanation of the track wobble. FIG. 4A is a magnified view showing the optical disk 1 for the case that there is no wobble, and FIG. 4B is a magnified view showing the optical disk 1 for the case that there is wobble. The track wobble shown in FIG. 4B has a frequency that is higher than the frequency band of the tracking control, so that the focus of the light beam scans the vicinity of the track center, regardless of whether there is wobble or not. The wobble amplitude detector 65 detects the amplitude of wobble of a predetermined frequency in the tracks on the optical disk shown in FIG. 4B, and sends this amplitude to a variable multiplier 66.

The recording region detector 70 serving as the recorded region detection means detects the amplitude value of the light amount signal from the optical detector 20, and a high-level signal is sent to the variable multiplier 66 if the light beam is irradiated onto a recorded region of the optical disk 1, whereas a low-level signal is sent to the variable multiplier 66 if the light beam is irradiated onto an unrecorded region of the optical disk 1.

A recording operation indicator 69 sends a low-level signal to the variable multiplier 66 and the variable power laser 21 if information recorded on the optical disk 1 is being reproduced, and sends a high-level signal to the variable multiplier 66 and the variable power laser 21 if information is being recorded on the optical disk 1. The variable power laser 21 emits at reproducing power if the signal from the recording operation indicator 69 is low-level, and emits pulses at recording power if the signal from the recording operation indicator 69 is high-level.

The variable multiplier 66 switches the multiplication factor with which the signal from the wobble amplitude detector 65 is multiplied in accordance with the logical state of the signal from the recording operation indicator 69 and the recording region detector 70, and sends the thusly obtained signal to the Fc anomaly detector 67. If the time at which the signal from the variable multiplier 66 becomes lower than a predetermined level compared to a reference level continues for more than an anomaly detection time TW, then the internal status of the Fc anomaly detector 67 is set to a state indicating that the focus control has been lost. The Fc anomaly detector 67 switches the anomaly detection time TW based on the signal from the Tk control operation indicator 68.

Referring to FIG. 5, the following is an explanation of the operation of focus anomaly detection for the case that the tracking control is in a inoperative state. FIG. 5A shows the signal that is output from the wobble amplitude detector 65, FIG. 5B shows the signal that is output from the recording operation indicator 69, FIG. 5C shows the signal that is output from the recording region detector 70, and FIG. 5D shows the signal that is output from the variable multiplier 66. FIG. 5E shows the internal status of the Fc anomaly detector 67.

In the following explanations, it is assumed that first, information is recorded on an unrecorded region, then information on an unrecorded region is reproduced, then information on a recorded region is reproduced, and then the focus control is lost during the reproduction operation for the recorded region.

Since no tracking control is carried out, that is, since the tracking control is in the inoperative state, the signal from the Tk control operation indicator 68 is low-level, and the driving signal sent to the Tk actuator 17 is zero. The light beam traverses the tracks in accordance with the eccentric state of the tracks on the optical disk 1. The wobble amplitude detector 65 detects the wobble for on-track states, but the more off-track the state becomes, the less can the wobble be detected. Therefore, the signal that is output from the wobble amplitude detector 65 fluctuates, as shown in FIG. 5A.

Figure 5A:
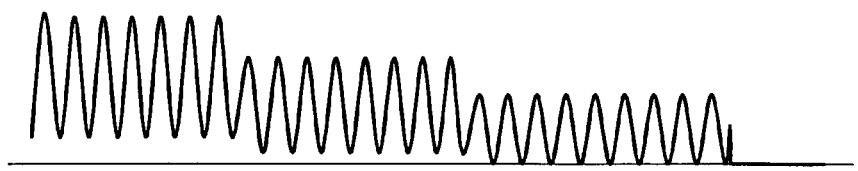
FIG. 5A shows the signal that is output from the wobble amplitude detector in the second embodiment of the present invention.
Figure 5B:
FIG. 5B shows the signal that is output from the recording operation indicator in the second embodiment of the present invention.

When transitioning from the state of recording information to a state of reproducing information, the signal that is output from the recording operation indicator 69 changes from high-level to low-level, as shown in FIG. 5B.

Figure 5C:
FIG. 5C shows the signal that is output from the recording region detector in the second embodiment of the present invention.

When the position to which the light beam is irradiated transitions from an unrecorded region on the optical disk 1 to a recorded region, the signal that is output from the recording region detector 70 changes from low-level to high-level, as shown in FIG. 5C. The wobble amplitude detector 65 detects the wobble amplitude from the reflected light, so that the detection result depends on the reflected light amount.

That is to say, as shown in FIG. 5A, even for the same unrecorded region (when the signal that is output from the recording region detector 70 in FIG. 5C is low-level), the wobble amplitude detected by the wobble amplitude detector 65 is larger in the case that information is being recorded (when the signal that is output from the recording operation indicator 69 in FIG. 5B is high-level) than in the case that information is being reproduced (when the signal that is output from the recording operation indicator 69 in FIG. 5B is low-level). And also for the same state in which information is being reproduced (when the signal that is output from the recording operation indicator 69 in FIG. 5B is low-level), the wobble amplitude detected by the wobble amplitude detector 65 is larger in the case that the light beam is irradiated on an unrecorded region (when the signal that is output from the recording region detector 70 in FIG. 5C is low-level) than in the case that the light beam is irradiated on a recording region (when the signal that is output from the recording region detector 70 in FIG. 5C is high-level).

Figure 5D:
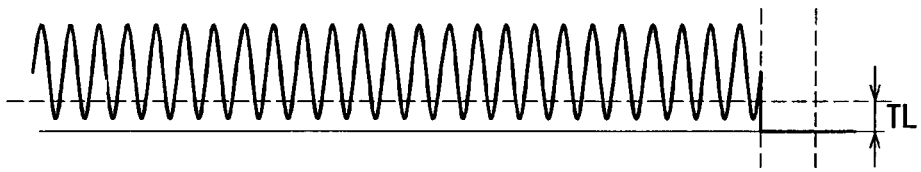
FIG. 5D shows the signal that is output from the variable multiplier in the second embodiment of the present invention.
Figure 5E:
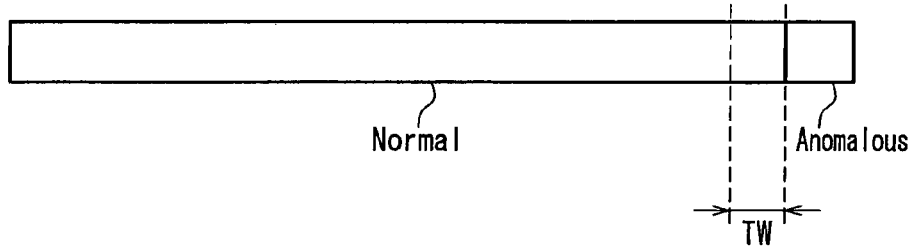
FIG. 5E shows the internal status of the Fc anomaly detector in the second embodiment of the present invention.

These changes in the detection sensitivity of the wobble amplitude detector 65 are constant, so that the changes in the detection sensitivity of the wobble amplitude detector 65 can be corrected by providing the wobble amplitude detector 65 with a fluctuating detection sensitivity switching means (not shown in the drawings) that sends to the variable multiplier 66 a signal that switches the multiplication factor of the variable multiplier 66 in accordance with the emission power of the variable power laser 21 and the reflectivity of the optical disk 1, depending on whether information is being recorded or information is being reproduced. That is to say, even if the output of the light beam changes and the light amount reflected from the optical disk 1 changes depending on whether information is being recorded or information is being reproduced, the change in the reflected light amount can be canceled by switching the detection sensitivity of the wobble amplitude detector 65 between the case that information is being recorded and the case that information is being reproduced, so that the amplitude of the signal that is output from the variable multiplier 66 can be made constant, as shown in FIG. 5D. As a result, erroneous detection with the Fc anomaly detector 67 can be prevented. Moreover, by providing the wobble amplitude detector 65 with a fluctuating detection sensitivity switching means (not shown in the drawings) that sends to the variable multiplier 66 a signal that switches the multiplication factor of the variable multiplier 66 depending on whether the region on which the light beam is irradiated is in a recorded or an unrecorded state, the change in the reflected light amount can be similarly canceled by switching the detection sensitivity of the wobble amplitude detector 65 even if the output of the light beam changes and the light amount reflected from the optical disk 1 changes depending on whether a recorded region is irradiated or an unrecorded region is irradiated, so that erroneous detection with the Fc anomaly detector 67 can be prevented.

Since the signal from the Tk control operation indicator 68 is low-level, the Fc anomaly detector 67 selects the anomaly detection time TW for the case that the tracking control is in the inoperative state. Then, the Fc anomaly detector 67 measures the time that the state continues in which the signal from the variable multiplier 66 is lower than the anomaly detection level TL, and when this time becomes longer than the anomaly detection time TW, the internal status of the Fc anomaly detector 67 is set to the state indicating that the focus control has been lost. In this case, by making the anomaly detection time TW longer than the period in which the light beam traverses the tracks, a erroneous detection in the off-track state can be prevented. When the focus control is lost, the signal that is output from the wobble amplitude detector 65 becomes zero, so that the internal status of the Fc anomaly detector 67 is set to the state indicating that the focus control has been lost after an anomaly has occurred and after the anomaly detection time TW has passed.

The reflected light is detected over a broad range from the state in which the focus of the light beam is positioned on the information surface of the optical disk 1, so that there is a constant limit to the detection speed of the focus anomaly detection using the reflected light amount. On the other hand, since the detected range of the wobble amplitude is small compared to that of the reflected light, the detection speed can be increased with a focus anomaly detection using the wobble amplitude.

If the tracking control is in the operative state, the light beam always follows the tracks, so that the signal that is output from the wobble amplitude detector 65 does not fluctuate as it does when the tracking control is in the inoperative state. Therefore, if the anomaly detection time TW of the Fc anomaly detector 67 is longer than the wobble period, erroneous detections by the Fc anomaly detector 67 can be prevented, so that the anomaly detection time TW can be set shorter than when the tracking control is in the inoperative state. Consequently, it becomes possible to perform a very fast anomaly detection.

It should be noted that in the present embodiment, the Fc anomaly detector 67 serving as the anomaly detection means is operated also when the tracking control is in the inoperative state. If the tracking control is in the inoperative state, the focus of the light beam traverses the tracks on the optical disk 1, and the detection sensitivity of the wobble amplitude detection differs for the case that the light beam is irradiated on a track and the case that the light beam is irradiated between tracks (if the light beam is irradiated between tracks, the detection sensitivity decreases). Therefore, an accurate wobble amplitude cannot be obtained, and the Fc anomaly detector 67 produces a erroneous detection. Consequently, if the Fc anomaly detector 67 is operated only when the tracking control is in the operative state, then the Fc anomaly detector 67 is not affected by track traversing due to eccentricity, and the wobble signal components are emphasized, so that the detection precision of the Fc anomaly detector 67 can be increased.

Moreover, in the present embodiment, the signal from the wobble amplitude detector 65 is multiplied with different values depending on whether the light beam is irradiated on a recorded region of the optical disk 1 or irradiated on an unrecorded region, and erroneous detections by the Fc anomaly detector 67 are prevented, but the same effect can also be attained with a configuration in which the signal level at which it is judged that the focus control is lost is changed in the Fc anomaly detector 67, depending on whether the light beam is irradiated on a recorded region of the optical disk 1 or irradiated on an unrecorded region. Furthermore, it is also possible to provide the Fc anomaly detector 67 with an anomaly level switching means (not shown in the drawings) that switches the signal change level of the wobble amplitude detector 65 at which it is judged that the focus control is lost, that is, at which it is judged that there is an anomaly, in accordance with the result detected by the recording region detector 70, depending on whether the light beam is irradiated on a recorded region of the optical disk 1 or irradiated on an unrecorded region.

Moreover, the present embodiment has been explained by giving an example in which erroneous detections of the Fc anomaly detector 67 are prevented by switching the value with which the signal from the wobble amplitude detector 65 is multiplied by the variable multiplier 66 depending on whether information is being recorded or information is being reproduced, but it is also possible to change the level at which the Fc anomaly detector 67 judges that the focus control is lost, depending on whether information is being recorded or information is being reproduced. Moreover, a configuration is also possible in which the Fc anomaly detector 67 is provided with an anomaly level switching means (not shown in the drawings) that switches the signal change level of the wobble amplitude detector 65 at which it is judged that focus control has been lost, that is, that there is an anomaly, in accordance with the result detected with the recording region detector 70.

THIRD EMBODIMENT

Figure 6:
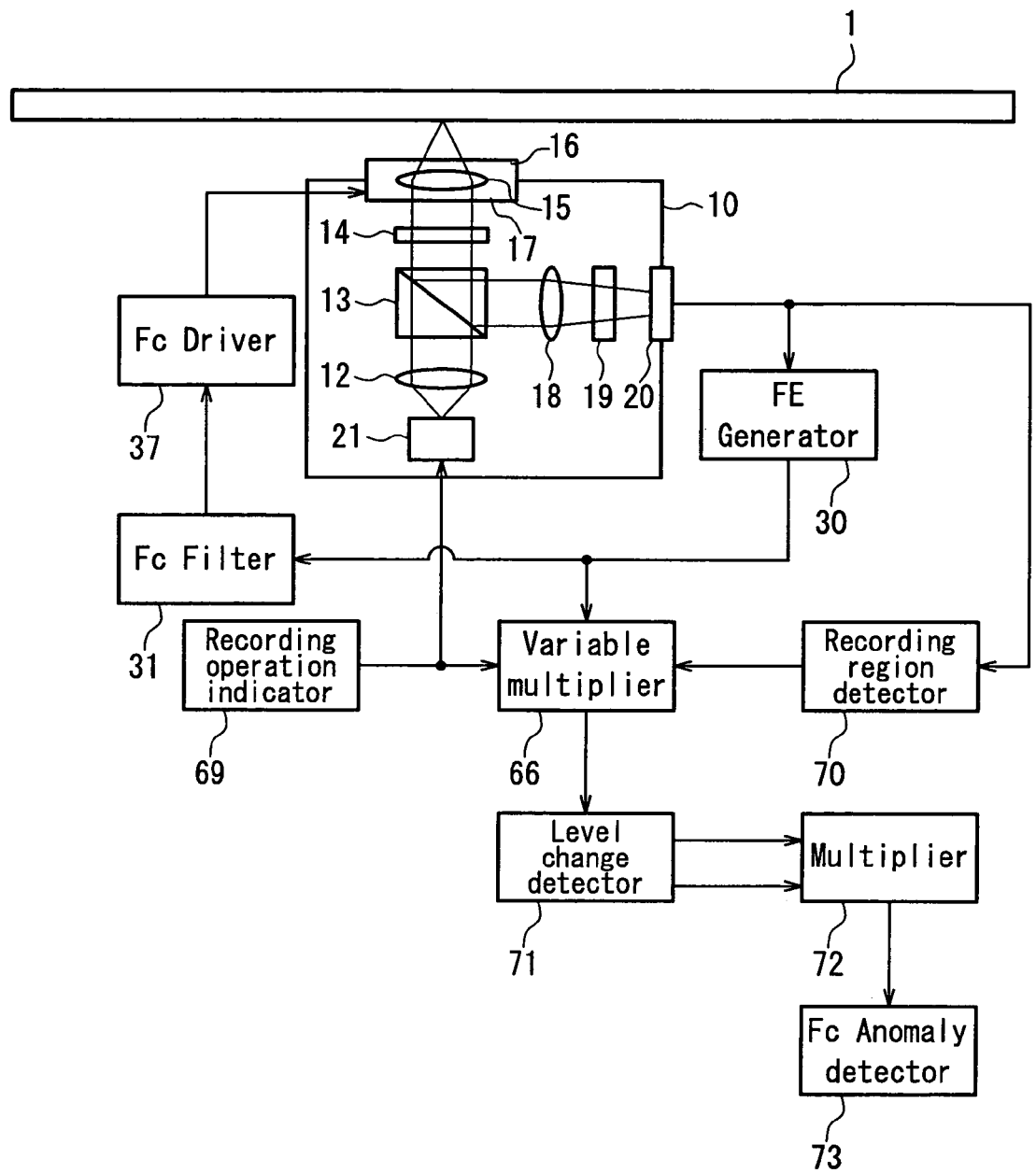
FIG. 6 is a block diagram showing an optical disk apparatus in accordance with a third embodiment of the present invention.

FIG. 6 is a block diagram showing an optical disk apparatus in accordance with a third embodiment of the present invention. It should be noted that structural elements that are the same as in FIG. 1 of the first embodiment have been denoted by the same numerals, and their further explanation has been omitted.

As shown in FIG. 6, also in the present embodiment, a variable power laser 21 is used as the semiconductor laser, as in the second embodiment. Moreover, also in the present embodiment, as in the second embodiment, the FE generator 30 sends the FE signal via the Fc filter 31 and the Fc driver 37 to the Fc actuator 16. That is to say, different from the first embodiment, the FE signal from the FE generator 30 is sent to the Fc actuator 16 not via the driving selector 32 (see FIG. 1), but only via the Fc filter 31 and the Fc driver 37. The FE signal from the FE generator 30 is also sent to the variable multiplier 66 serving as a multiplication means and a gain switching means.

The optical detector 20 sends the detected light amount signal to the FE generator 30 and the recording region detector 70.

Detecting the amplitude of the light amount signal from the optical detector 20, the recording region detector 70 sends a high-level signal to the variable multiplier 66 if the light beam is irradiated onto a recorded region of the optical disk 1, whereas a low-level signal is sent to the variable multiplier 66 if the light beam is irradiated onto an unrecorded region of the optical disk 1.

A recording operation indicator 69 sends a low-level signal to the variable multiplier 66 and the variable power laser 21 if information recorded on the optical disk 1 is being reproduced, and sends a high-level signal to the variable multiplier 66 and the variable power laser 21 if information is being recorded on the optical disk 1. The variable power laser 21 emits at reproducing power if the signal from the recording operation indicator 69 is low-level, and emits pulses at recording power if the signal from the recording operation indicator 69 is high-level.

The variable multiplier 66 switches the multiplication factor with which the signal from the FE generator 30 is multiplied in accordance with the logical state of the signal from the recording operation indicator 69 and the signal from the recording region detector 70, multiplies this multiplication factor with the signal from the FE generator 30, and sends the thusly obtained signal to a level change detector 71.

The level change detector 71 performs an integration of the focus displacement signal by increasing a counter value when the signal from the variable multiplier 66 falls into a predetermined level range W with respect to a reference level.

Moreover, when the signal from the variable multiplier 66 does not fall into a predetermined level range W with respect to a reference level (that is, when the predetermined level range W is exceeded), the level change detector 71 clears the counter value to zero with a clearing means (not shown in the drawings) provided in the level change detector 71, and sets the signal level of the variable multiplier 66 to the reference level. The level change detector 71 sends the reference level and the counter value of the counter provided in the level change detector 71 to a multiplier 72. By multiplying the counter value of the variable multiplier 66 and the absolute value of the reference level in the focus integration means constituted by the counter and the multiplier 72, the multiplier 72 calculates a value corresponding to the integrated focus displacement signal, and sends the result of this multiplication to an Fc anomaly detector 73 serving as an anomaly detection means.

If the signal from the multiplier 72 is at or below an anomaly detection level, then the internal status of the Fc anomaly detector 73 is set to a state indicating that the focus control is in normal condition, and if the signal from the multiplier 72 is larger than the anomaly detection level, then the internal status of the Fc anomaly detector 73 is set to a state indicating that the focus control has been lost.

Referring to FIGS. 7 to 9, the following is an explanation of the operation of the focus anomaly detection according to the present embodiment.

FIG. 7 shows the signal of the FE generator 30 for the case that the focus of the light beam has passed in the focus direction through the information surface of the optical disk 1. As shown in FIG. 7, if the focus of the light beam is near the information surface of the disk 1, a focus direction error signal appears, and if the focus of the light beam is to a certain extent removed from the information surface of the optical disk 1, then the signal of the FE generator 30 assumes a constant value.

FIG. 8 illustrates how the detection signal is generated. FIG. 8A shows the signal that is output from the FE generator 30, FIG. 8B shows the signal that is output from the recording operation indicator 69, FIG. 8C shows the signal that is output from the recording region detector 70, and FIG. 8D shows the signal that is output from the variable multiplier 66.

To facilitate the understanding of the operation in the following, a case is explained in which, first, information is recorded on an unrecorded region, and then information is reproduced from an unrecorded region and then from a recorded region. Even when the focus control is in the operative state, the focus error is not eliminated completely, and, as shown in FIG. 8A, a residual difference due to surface fluctuations, scratches in the disk or surface roughness remains.

When transitioning from a state in which information is recorded to a state in which information is reproduced, the signal that is output from the recording operation indicator 69 changes from high-level to low-level, as shown in FIG. 8B.

When the position on which the light beam is irradiated transitions from an unrecorded region to a recorded region on the optical disk 1, the signal that is output from the recording region detector 70 changes from low-level to high-level, as shown in FIG. 8C.

Since the FE generator 30 detects the FE signal from the reflected light, the detection result differs depending on the reflected light amount. That is to say, as shown in FIG. 8A, even for the same unrecorded region (when the signal that is output from the recording region detector 70 in FIG. 8C is low-level), the amplitude of the FE signal generated with the FE generator 30 is larger in the case that information is being recorded (when the signal that is output from the recording operation indicator 69 in FIG. 8B is high-level) than in the case that information is being reproduced (when the signal that is output from the recording operation indicator 69 in FIG. 8B is low-level). And also for the same state in which information is being reproduced (when the signal that is output from the recording operation indicator 69 in FIG. 8B is low-level), the amplitude of the FE signal generated with the FE generator 30 is larger in the case that the light beam is irradiated on an unrecorded region (when the signal that is output from the recording region detector 70 in FIG. 8C is low-level) than in the case that the light beam is irradiated on a recording region (when the signal that is output from the recording region detector 70 in FIG. 8C is high-level).

These changes in the detection sensitivity of the FE generator 30 are constant, so that by providing the variable multiplier 66 with a gain switching means (not shown in the drawings) that switches the multiplication factor of the variable multiplier 66 in accordance with the emission power of the variable power laser 21 and the reflectivity of the optical disk 1 depending on whether information is being recorded or information is being reproduced, it is possible to cancel changes in the reflected light amount by switching the multiplication factor of the variable multiplier 66 depending on whether information is being recorded or information is being reproduced, even when the output of the light beam changes and the reflected light amount from the optical disk 1 changes depending on whether information is recorded or information is reproduced, so that it is possible to attain a constant amplitude of the signal that is output from the variable multiplier 66, as shown in FIG. 8D. As a result, erroneous detection of the Fc anomaly detector 73 can be prevented.

Moreover, by providing the variable multiplier 66 with a gain switching means (not shown in the drawings) that switches the multiplication factor of the variable multiplier 66 depending on whether the light beam is irradiated on a recorded region or an unrecorded region, it is similarly possible to cancel changes in the reflected light amount by switching the multiplication factor of the variable multiplier 66, even when the output of the light beam changes and the reflected light amount from the optical disk 1 changes depending on whether the light beam is irradiated on a recorded region or on an unrecorded region, so that erroneous detection of the Fc anomaly detector 73 can be prevented.

FIG. 9 illustrates how the focus control is lost from a normal state, while the focus control is in an operative state. FIG. 9A shows the signal that is output from the variable multiplier 66, FIG. 9B shows the reference level of the level change detector 71, FIG. 9C shows the counter value of the level change detector 71, and FIG. 9D shows the signal that is output from the multiplier 72. Moreover, FIG. 9E shows the internal status of the Fc anomaly detector 73.

Figure 9A:
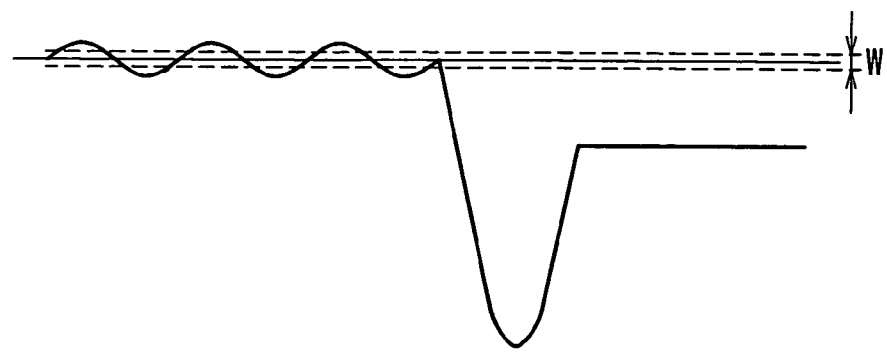
FIG. 9A shows the signal that is output from the variable multiplier in the third embodiment of the present invention.
Figure 9B:
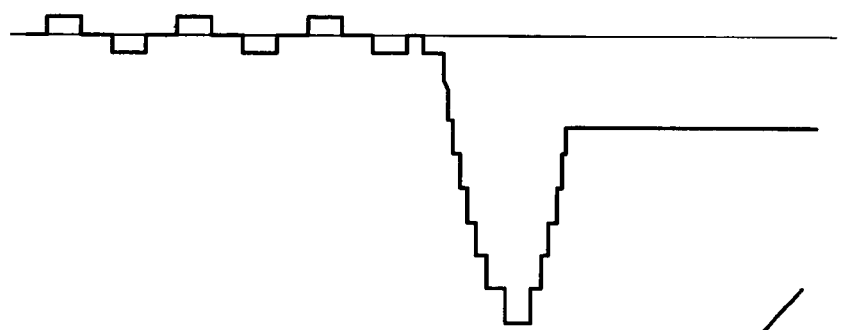
FIG. 9B shows the reference level of the level change detector in the third embodiment of the present invention.
Figure 9C:
FIG. 9C shows the counter value of the level change detector in the third embodiment of the present invention.

As shown in FIG. 9A, by making the compared level range W, which is a parameter for changing the reference level of the level change detector 71, smaller than the residual difference of the focus control, the reference level of the level change detector 71 is frequently rewritten due to the residual difference of the focus control, as shown in FIG. 9B, if the focus control is in the normal state, so that the counter value of the level change detector 71 does not become large, as shown in FIG. 9C.

Figure 9D:
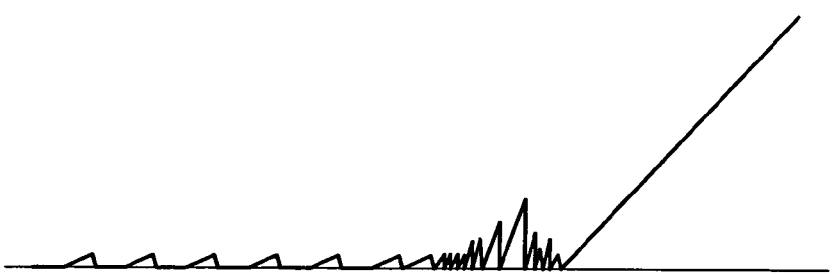
FIG. 9D shows the signal that is output from the multiplier in the third embodiment of the present invention.
Figure 9E:
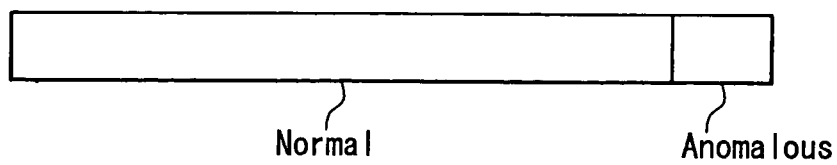
FIG. 9E shows the internal status of the Fc anomaly detector in the third embodiment of the present invention.

When the focus control deviates from the normal state, the signal that is output from the variable multiplier 66 takes on a constant value, as shown in FIG. 9A, so that the counter value of the level change detector 71 is incremented, as shown in FIG. 9C, and at the same time, also the signal that is output from the multiplier 72 increases, as shown in FIG. 9D. When the signal that is output from the multiplier 72 reaches the anomaly detection level, the internal status of Fc anomaly detector 73 is set to a state indicating that the focus control has been lost, as shown in FIG. 9E.

Here, the light amount reflected from the optical disk 1 differs depending on whether the focus of the light beam is positioned on a track of the optical disk 1 or positioned between tracks the Fc anomaly detection 73 occasionally may make a erroneous detection when the detection speed of the focus anomaly detection due to the reflected light amount is increased. For this reason, if the tracking control is in the inoperative state.

With the focus anomaly detection in the present embodiment, the detection speed can be made faster, regardless of whether the tracking control is in the operative state or in the inoperative state.

It should be noted that in the present embodiment, the results of a multiplication of the reference level and the counter value of the level change detector 71 are sent to the Fc anomaly detector 73, but there is no limitation to this configuration. For example, it is also possible to send only the counter value to the Fc anomaly detector 73, compare the counter value with the anomaly detection level, and when the counter value is above the anomaly detection level, set the internal state of the Fc anomaly detector 73 to a state indicating that the focus control has been lost.

Moreover, in the present embodiment, erroneous detections with the Fc anomaly detector 73 are prevented by switching the multiplication factor of the variable multiplier 66 depending on whether the light beam is irradiated onto a recorded region or onto an unrecorded region, or depending on whether information is being recorded or reproduced, and multiplying the signal from the FE generator 30 with this multiplication factor, but there is no limitation to this configuration. For example, the same effect can also be attained without providing the variable multiplier 66, by providing a judgment level switching means (not shown in the drawings) that switches the signal level of the Fc generator 30 that is judged to be anomalous by changing the compared level range W, which is a parameter for altering the reference level of the level change detector 71, depending on whether information is recorded or reproduced. It is also possible to provide a judgment level switching means (not shown in the drawings) that switches the signal level of the Fc generator 30 that is judged to be anomalous by changing the compared level range W depending on whether the light beam is irradiated onto a recorded region or onto an unrecorded region.

FOURTH EMBODIMENT

Figure 10:
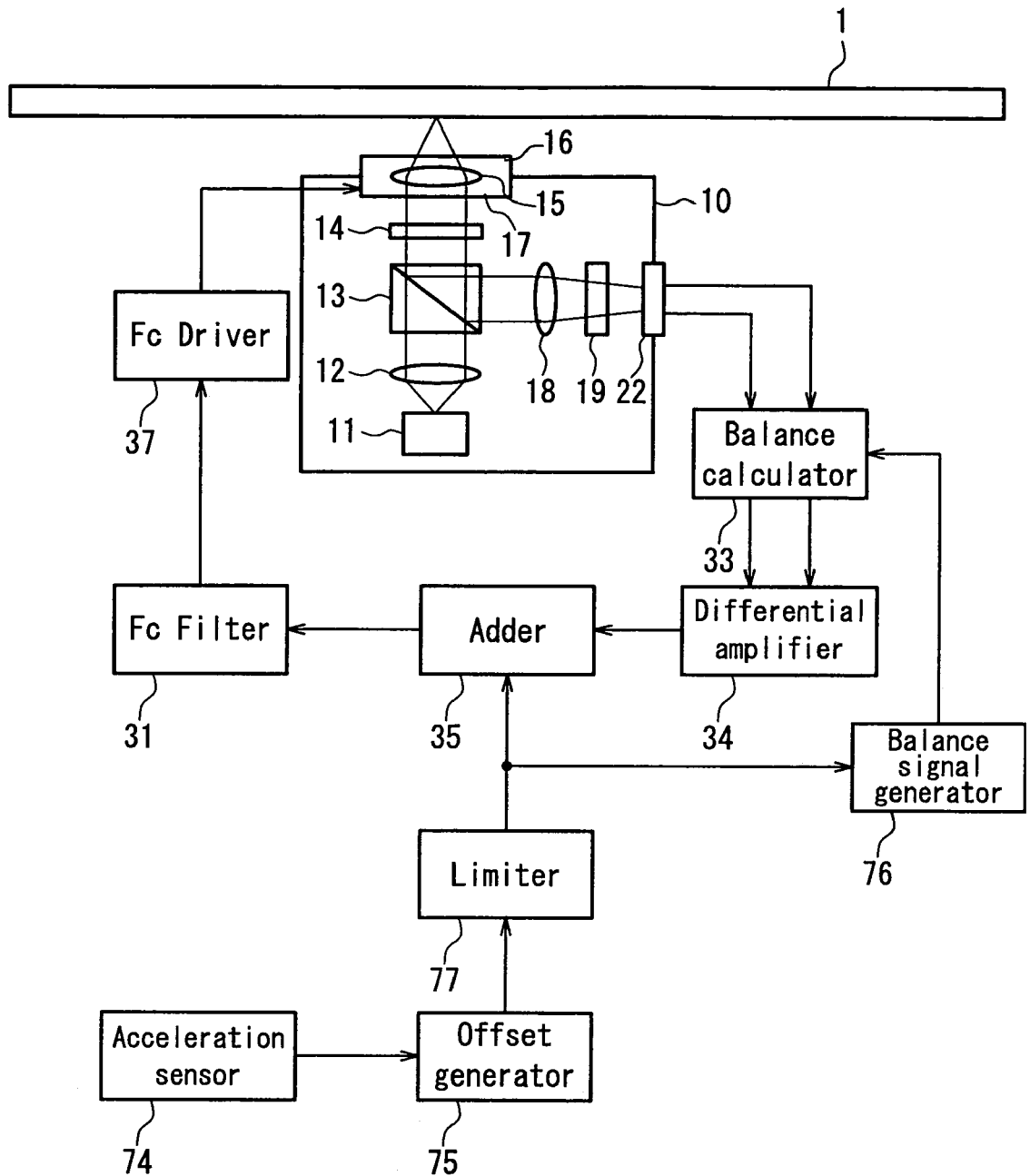
FIG. 10 is a block diagram showing an optical disk apparatus in accordance with a fourth embodiment of the present invention.

FIG. 10 is a block diagram showing an optical disk apparatus in accordance with a fourth embodiment of the present invention. It should be noted that structural elements that are the same as in FIG. 1 of the first embodiment have been denoted by the same numerals, and their further explanation has been omitted.

As shown in FIG. 10, in the present embodiment, a focus displacement signal detection means corresponding to the FE generator 30 in FIG. 1 is constituted by a balance calculator 33, a differential amplifier 34, and an adder 35. As an optical detector, an optical detector 22 is used that is different from the optical detector 20 in FIG. 1. The optical detector 20 in FIG. 1 outputs signals corresponding to the received light amounts at a plurality of light-receiving portions in the detector, whereas the optical detector 22 of the present embodiment additionally calculates a differential signal for generating a focus displacement signal and outputs this differential signal.

The optical detector 22 generates two differential input signals for detecting a focus error from the detected light amount signals, and sends these differential input signals to the balance calculator 33.

If the balance signal from the balance signal generator 76 is larger than zero (reference level), then the balance calculator 33 performs a balance calculation with which one of the two differential input signals output from the optical detector 22 is amplified a lot, and the other differential input signal is amplified a little. That is to say, balance calculations such as "one differential input signal" ×(1+balance signal) and "other differential input signal" ×(1−balance signal) are performed. Then, the balance calculator 33 sends the two signals to the differential amplifier 34. The differential amplifier 34 generates a differential output of the two signals from the balance calculator 33, and sends this differential output to the adder 35.

The adder 35 adds the signal from the differential amplifier 34 and the signal from an offset generator 75, and sends the resulting signal to the Fc filter 31.

An acceleration sensor 74 made of a device such as a piezoelectric element or the like serving as a vibration detection means detects vibrations acting on the optical disk apparatus as an electric charge amount, and detects the vibration of the optical disk apparatus by converting this electric charge amount into a voltage. An acceleration signal corresponding to the vibration magnitude detected by this acceleration sensor 74 is sent to a limiter 77 via an offset generator 75.

Figure 11:
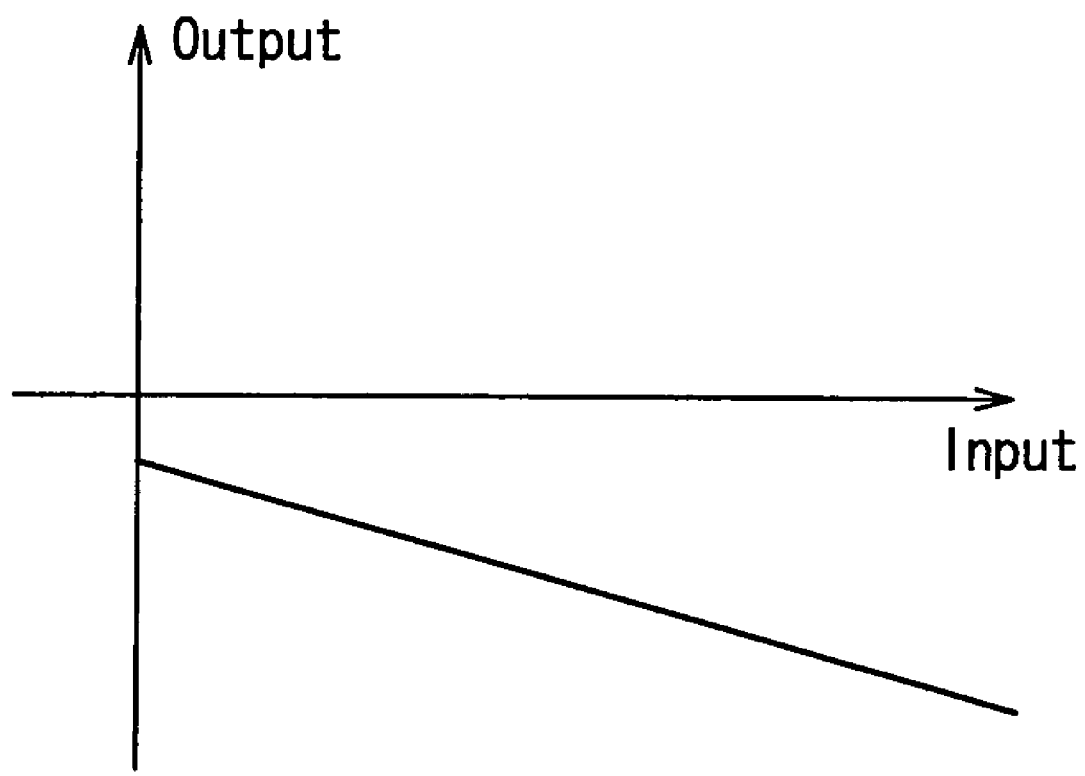
FIG. 11 is a graph of the input/output characteristics of the offset generator in the fourth embodiment of the present invention.

FIG. 11 shows an example of the input/output characteristics of the offset generator 75. As shown in FIG. 11, the offset generator 75 is designed such that its output is larger, the larger the acceleration signal from the acceleration sensor 74 is.

The limiter 77 restricts the signal from the offset generator 75 such that it does not become greater than a predetermined level, and sends this signal to the adder 35 and to the balance signal generator 76. The balance signal generator 76 generates a balance signal for switching the gains of the balance calculator 33 such that the operating point of the adder 35 does not change, in accordance with the signal from the offset generator 75, and sends the generated balance signal to the balance calculator 33. Ensuring that the operating point of the adder 35 does not change ensures that also the operating point of the Fc filter 31 does not change.

Figure 12A:
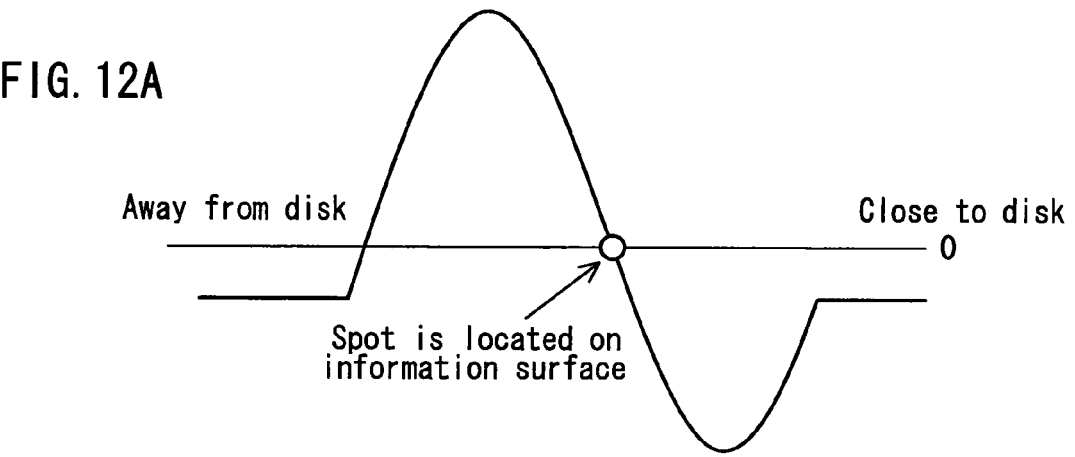
FIG. 12A shows the signal that is output from the adder when there is no vibration in the fourth embodiment of the present invention.
Figure 12B:
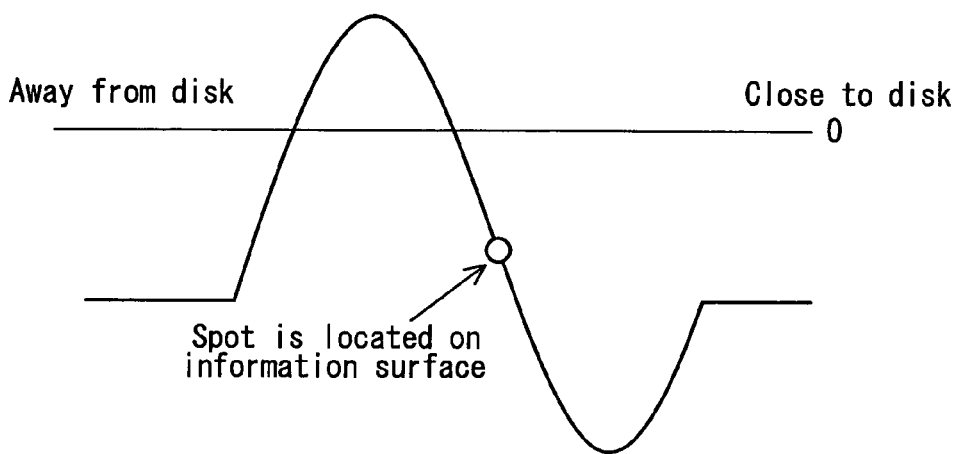
FIG. 12B shows the signal that is output from the adder when vibration is detected and when there is no output from the balance signal generator in the fourth embodiment of the present invention.
Figure 12C:
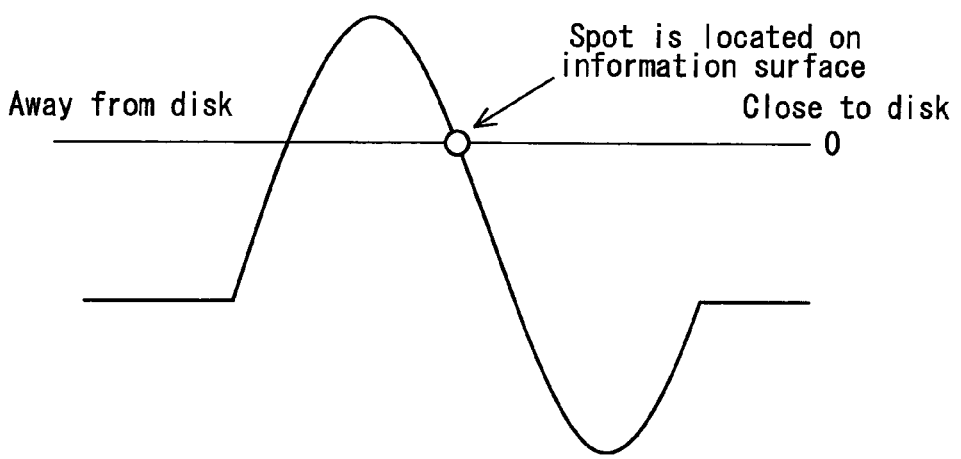
FIG. 12C shows the signal that is output from the adder when vibration is detected and when there is an output from the balance signal generator in the fourth embodiment of the present invention.

Referring to FIG. 12, the following is an explanation of the operation of the collision evasion in accordance with the present embodiment. FIG. 12A shows the signal that is output from the adder 35 when there is no vibration, FIG. 12B shows the signal that is output from the adder 35 when vibration is detected and when there is no output from the balance signal generator 76, and FIG. 12C shows the signal that is output from the adder 35 when vibration is detected and when there is an output from the balance signal generator 76. All diagrams of FIG. 12 show the signals for the case that the focus control is inoperative, and the focus of the light beam passes through the information surface of the optical disk 1.

When there is no vibration, the signal that is output from the adder 35 takes on the state as shown in FIG. 12A, and the focus of the light beam is regulated to the information surface of the optical disk 1 by the focus control.

When there is vibration, the offset generator 75 generates an offset signal corresponding to the vibration magnitude, and if vibration occurs and the balance signal does not change before and after the offset signal from the offset generator 75 changes, then the signal that is output from the adder 35 takes on the state as shown in FIG. 12B. That is to say, outside the focus error (FE) detection range, the signal that is output from the adder 35 becomes even smaller. The Fc filter 31 can generate a driving signal for the Fc actuator 16 that displaces the condensing lens 15 in a direction away from the optical lens 1, the displacement being greater the smaller the signal that is output from the adder 35 is (the larger the vibration acting on the apparatus is).

Thus, even when the focus control is lost due to vibrations or shock and the focus of the light beam has left the FE detection range, a driving signal is applied to the Fc actuator 16 that causes the condensing lens 15 to be displaced considerably in a direction away from the optical disk 1, in accordance with the magnitude of the vibration acting on the optical disk apparatus, so that collisions between the condensing lens 15 and the optical disk 1 can be prevented.

As shown in FIG. 12B, when a vibration occurs in the case that the focus control is in the normal state, the focus of the light beam is not controlled to the information surface of the optical disk 1 anymore. In this case, the balance signal generator 76 sends a balance signal in accordance with the offset value of the offset generator 75 to the balance calculator 33, and by performing the balance calculation with the balance calculator 33, the focus of the light beam can be controlled to the information surface of the optical disk 1, as shown in FIG. 12C.

Moreover, when the offset generator 75 generates an offset amount that is too large, a large driving signal is applied to the Fc actuator 16 if the focus control has been lost, and there is the risk that the optical head 10 is damaged due the heat generated by the Fc actuator 16. In order to prevent this, the offset signal generated by the offset generator 75 is saturated at a predetermined level by the limiter 77.

As explained above, with the present embodiment, while maintaining a state in which the focus of the light beam is controlled to the information surface of the optical disk 1 if the focus control is in the normal state, a force that drives the condensing lens 15 away from the optical disk 1 can be increased in accordance with vibrations acting on the optical disk apparatus if the focus control is lost, so that collisions between the condensing lens 15 and the optical disk 1 can be prevented.

FIFTH EMBODIMENT

Figure 13:
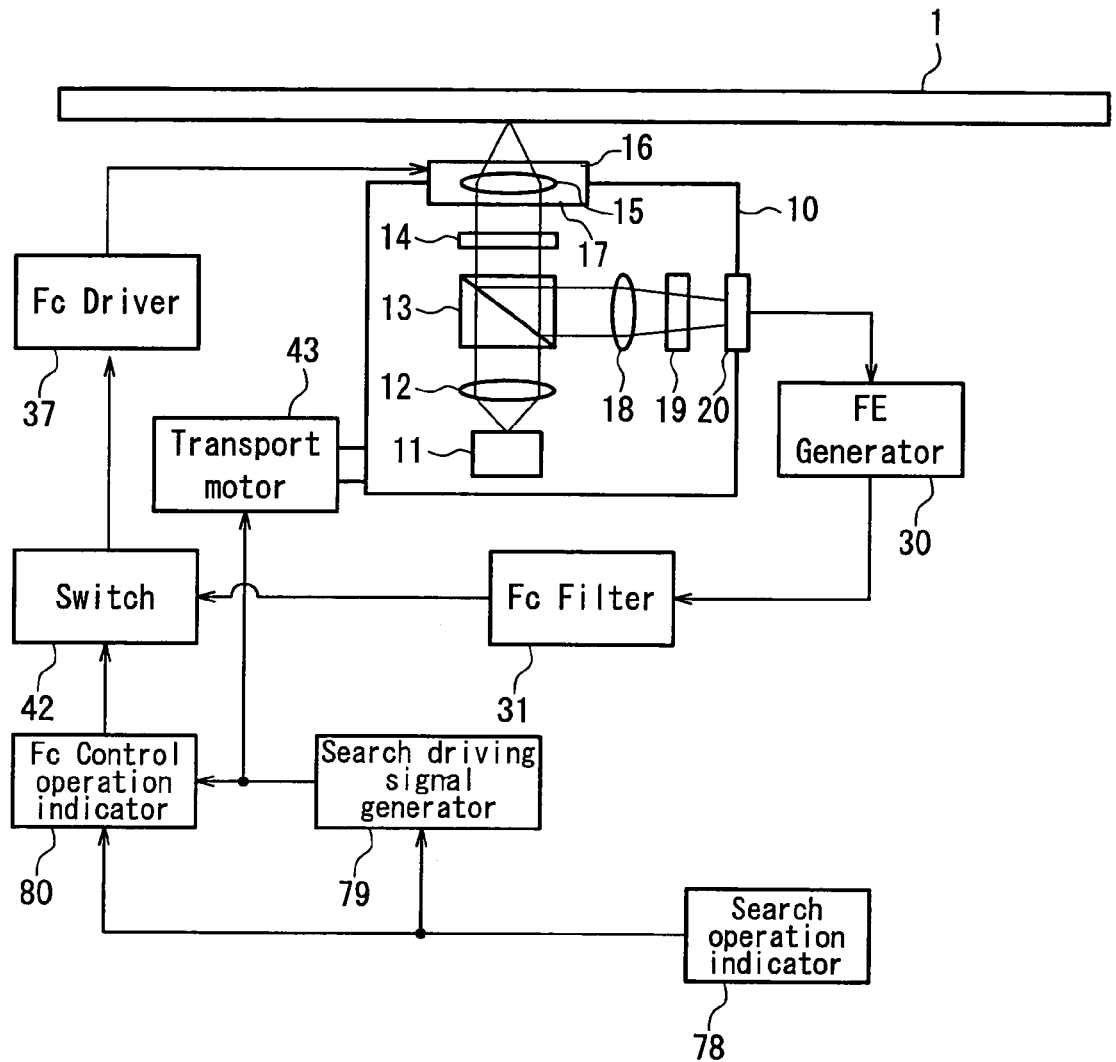
FIG. 13 is a block diagram showing an optical disk apparatus in accordance with a fifth embodiment of the present invention.
Figure 14:
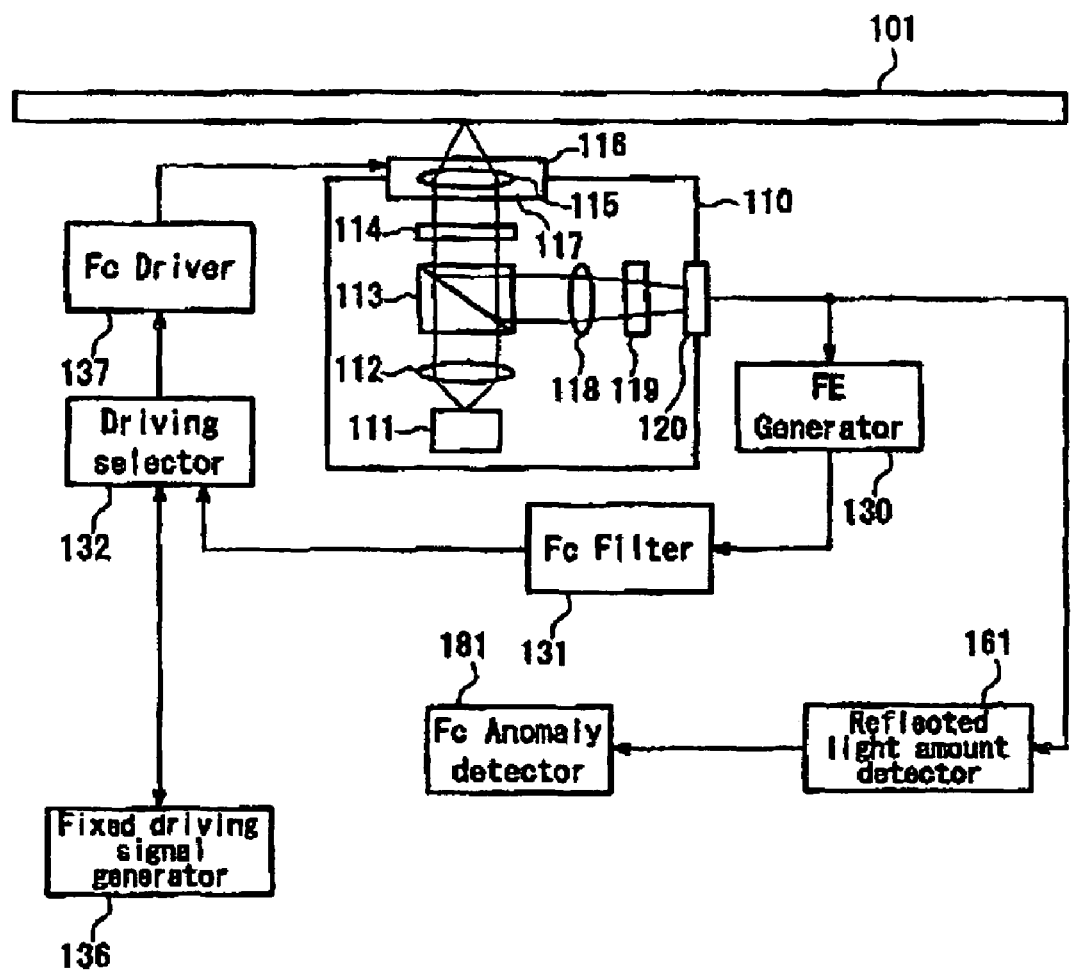
FIG. 14 is a block diagram showing a conventional optical disk apparatus.

FIG. 13 is a block diagram showing an optical disk apparatus in accordance with a fifth embodiment of the present invention. It should be noted that structural elements that are the same as in FIG. 1 of the first embodiment have been denoted by the same numerals, and their further explanation has been omitted.

As shown in FIG. 13, the signal from the Fc filter 31 is sent via the switch 42 and the Fc driver 37 to the Fc actuator 16. A signal related to the shifting distance, which is indicated by a search operation indicator 78 serving as a searching means for shifting the condensing lens 15 such that the light beam is irradiated onto the desired track on the optical disk 1, is sent to a search driving signal generator 79 and a focus control operation indicator (referred to as "Fc control operation indicator" in the following) 80.

Moreover, the driving signal from the search driving signal generator 79 is sent to a transport motor 43 and to the Fc control operation indicator 80.

The transport motor 43 moves the optical head 10 in a radial direction of the optical disk 1, in accordance with the driving signal from the search driving signal generator 79. Here, the surface fluctuations of the optical disk 1 increase at its outer periphery, so that when the focus control is in the inoperative state, the possibility that the optical lens 15 collides with the optical disk 1 at the outer periphery of the optical disk 1 is very high.

Moreover, when a search over a long distance is carried out, there is the risk that the condensing lens 15 is shaken through the casing of the optical head 10 due to the vibrations caused by that search, and the focus control is lost.

To address this problem, if the direction in which the focus of the light beam is moved across the tracks is the direction toward the outer periphery of the optical disk 1, and if the moving distance that is instructed by the search operation indicator 78 is the risk distance K or greater, wherein the risk distance K is defined as the search distance for which there is the risk that the focus control is lost, then the following signal is output from the Fc control operation indicator 80 to the switch 42. That is, the Fc control operation indicator 80 sends a low-level signal to the switch 42 if the search driving signal generator 79 generates a driving signal, and sends a high-level signal to the switch 42 if the search driving signal generator 79 does not generate a driving signal.

If the moving distance instructed from the search operation indicator 78 is smaller than the risk distance K, then the Fc control operation indicator 80 sends a high-level signal to the switch 42. If the signal from the Fc control operation indicator 80 is high-level, then the switch 42 sends the signal from the Fc filter 31 to the Fc actuator 16, and if the signal from the Fc control operation indicator 80 is low-level, then the switch 42 sends a zero to the Fc actuator 16.

The following is an explanation of the operation in the case that the moving distance (search distance) instructed by the search operation indicator 78 is longer than the risk distance K. While a search operation is performed, a driving signal is generated by the search driving signal generator 79, and a low-level signal is sent from the Fc control operation indicator 80 to the switch 42. During that time, the switch 42 sends a zero to the Fc actuator 16, so that the focus control becomes inoperative, and the condensing lens 15 is removed at a position at which it does not collide with the optical disk 1.

When the searching operation is finished and no driving signal is generated anymore by the search driving signal generator 79, a high-level signal is sent to the switch 42, and the focus control becomes operative again.

As explained above, with the present embodiment, if a search is performed over long distance of at least ⅓ stroke toward the outer periphery of the optical disk 1, then collisions between the condensing lens 15 and the optical disk 1 can be prevented by making the focus control inoperative, and ensuring a large distance between the condensing lens 15 and the optical disk 1, so that the practical effects are considerable.

Moreover, a configuration is also possible in which the search operation indicator 78 sets the focus control to the inoperative state, if the target track to which the focus of the light beam is to be moved is within a range of a predetermined distance from the outermost periphery of the optical disk 1.

Furthermore, a configuration is also possible in which the distance to which the focus of the light beam is moved is converted into a corresponding number of tracks, and if this converted number of tracks is greater than a predetermined number (for example the number of tracks corresponding to the risk distance K), then the search operation indicator 78 sets the focus control to the inoperative state.

INDUSTRIAL APPLICABILITY

As described above, with the present invention, collisions between the condensing lens and the optical disk can be avoided regardless whether the focus control is in the operative state or in the inoperative state, so that it can be used for optical disk apparatuses that are equipped with high-density optical disks, for which the possibility of collisions between the condensing lens and the optical disk is high.

The invention claimed is:

1. An optical disk apparatus, comprising:
a converging means for converging and irradiating a light beam from a light source toward a rotating information carrier;
a focus displacement signal detection means for generating a signal in accordance with a positional displacement of a focus of the light beam with respect to an information surface of the information carrier;
a focus shifting means for shifting the converging means in a direction normal to the information surface of the information carrier;
a focus control means for driving the focus shifting means in accordance with the signal from the focus displacement signal detection means, and performing a control such that the focus of the light beam follows the information surface of the information carrier;
an information surface detection means for detecting whether the focus of the light beam is near the information surface of the information carrier based on an amount of a light beam reflected from the information carrier, if the focus control means is in an inoperative state; and
a collision evasion means for changing a displacement direction of the converging means from a direction approaching the information carrier to a direction away from the information carrier in accordance with an information surface detection signal and when the focus control means is in an inoperative state, said collision evasionmeans generating a driving signal for the focus shifting means such that the converging means is displaced in a direction away from the information carrier if a signal is generated by the information surface detection means, otherwise, the converging means is displaced with a predetermined slope in a direction approaching the information carrier.

2. The optical disk apparatus according to claim 1, wherein the driving signal generated by the collision evasion means is a pulse signal having a predetermined peak value such that the converging means is displaced in a direction away from the information carrier.

3. The optical disk apparatus according to claim 1, wherein the driving signal generated by the collision evasion means is a ramp signal having a constant slope.

* * * * *

UNITED STATES PATENT AND TRADEMARK OFFICE
CERTIFICATE OF CORRECTION

PATENT NO. : 7,257,053 B2
APPLICATION NO. : 10/475473
DATED : August 14, 2007
INVENTOR(S) : Fujiune et al.

It is certified that error appears in the above-identified patent and that said Letters Patent is hereby corrected as shown below:

Column 30, line 50(claim 1): "collision evasionmeans" should read --collision evasion means--.

Signed and Sealed this

Seventeenth Day of June, 2008

JON W. DUDAS
*Director of the United States Patent and Trademark Office*